United States Patent
Saito

(10) Patent No.: US 7,911,653 B2
(45) Date of Patent: Mar. 22, 2011

(54) DEVICE USING LOW VISIBILITY ENCODED IMAGE TO MANAGE COPY HISTORY

(75) Inventor: Hitoshi Saito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 343 days.

(21) Appl. No.: 12/141,407

(22) Filed: Jun. 18, 2008

(65) Prior Publication Data

US 2008/0316538 A1 Dec. 25, 2008

(30) Foreign Application Priority Data

Jun. 20, 2007 (JP) ................... 2007-162721

(51) Int. Cl.
 *G06K 15/00* (2006.01)
 *G06F 3/12* (2006.01)
 *G06F 11/00* (2006.01)
 *H04N 1/40* (2006.01)

(52) U.S. Cl. ............ 358/3.28; 358/1.13; 358/1.14; 358/1.18; 358/3.23; 714/1; 714/100

(58) Field of Classification Search ......... 358/3.23, 358/3.28, 3.24, 1.14, 1.18, 1.13; 714/1, 100
See application file for complete search history.

(56) References Cited

U.S. PATENT DOCUMENTS

| | | | |
|---|---|---|---|
| 6,914,691 B1 * | 7/2005 | Sato | 358/1.15 |
| 7,095,514 B1 * | 8/2006 | Yamagata et al. | 358/1.14 |
| 7,339,599 B2 | 3/2008 | Hayashi | 345/629 |
| 7,548,340 B2 * | 6/2009 | Ishikawa et al. | 358/1.9 |
| 7,571,323 B2 * | 8/2009 | Iwamura et al. | 713/176 |
| 7,609,396 B2 * | 10/2009 | Harada | 358/1.1 |
| 7,639,820 B2 * | 12/2009 | Saito | 380/287 |
| 2006/0007471 A1 * | 1/2006 | Okamoto et al. | 358/1.14 |
| 2008/0018942 A1 * | 1/2008 | Komiya | 358/3.28 |
| 2008/0151288 A1 * | 6/2008 | Matsunoshita | 358/1.15 |
| 2008/0163364 A1 * | 7/2008 | Ferlitsch | 726/21 |

FOREIGN PATENT DOCUMENTS

| | | |
|---|---|---|
| JP | 05-130376 | 5/1993 |
| JP | 8-088756 | 4/1996 |
| JP | 2004-228896 | 8/2004 |
| JP | 2005-199486 | 7/2005 |
| JP | 2006-060805 | 3/2006 |

\* cited by examiner

*Primary Examiner* — Twyler L Haskins
*Assistant Examiner* — Jonathan R Beckley
(74) *Attorney, Agent, or Firm* — Fitzpatrick, Cella, Harper & Scinto

(57) ABSTRACT

The present invention relates to an image forming device using a low visibility information embedding technique to manage a copy history of an original. The image forming device embeds history information with the use of small dots disappearing by copying, and coordinate information on a region embedded with the history information with the use of large dots not disappearing even by copying. Upon first copying, the image forming device newly creates both of the large dot coordinate information and the small dot history information, and embeds them. Upon second or later copying, the image forming device updates the history information having been read out of the original with that on the current copying, and embeds the updated history information in the history information region indicated by the coordinate information.

5 Claims, 29 Drawing Sheets

| 1 | 2 | 3 |
|---|---|---|
| 4 | 5 | 6 |
| 7 | 8 | 9 |
| 10 | 11 | 12 |

FIG.4

| REGION | PURPOSE | ANALYSIS SPEED | DATA SIZE |
|---|---|---|---|
| FIRST REGION | REAL-TIME DETECTION INFORMATION | SIMILAR TO SCAN SPEED | SMALL SIZE |
| SECOND REGION | NON-REAL-TIME DETECTION INFORMATION | RELATIVELY LOW | LARGE SIZE |

DEVICE USING LOW VISIBILITY ENCODED IMAGE TO MANAGE COPY HISTORY

BACKGROUND OF THE INVENTION

1. Field of the Invention

The present invention relates to a technology for using a low visibility information embedding technique to manage a copy history of an original.

2. Description of the Related Art

An image processing technology for processing an image consisting of a latent image region and a background region, and creating printed material from which it is determinable whether or not the printed material is copied material, is disclosed in patent document Japanese Patent Laid-Open No. 2004-228896. In the patent document, in order to adapt a latent image element, which together with a background element constitutes a copy-forgery-inhibited pattern image, to disappear upon copying, while the background element does not disappear even upon copying, the latent image element consists of small dots, and the background element consists of large dots. In particular, in the patent document, by shifting the small dot group with respect to a grid point, additional information (e.g., information for a barcode) can be represented (see FIG. 7).

However, the patent document discloses processing for generating the copy-forgery-inhibited pattern image upon first printing, and therefore the additional information is represented by the small dots only upon the first printing. For this reason, the technique disclosed in the patent document cannot represent new additional information using the small dots, upon copying.

SUMMARY OF THE INVENTION

An object of the present invention is to embed small dots representing new additional information in a region where small dots have disappeared due to copying, i.e., a region where the small dots had been present before copying, but disappeared, to thereby manage a copy history of an original.

A device of the present invention includes: an image processing component for processing an image to obtain an image-processed image, the image having been obtained by scanning an original printed with a copy-forgery-inhibited pattern image including a small dot group and a large dot group; and an arrangement component for arranging a small dot group in a coordinate position based on new additional information within a region on the image-processed image, the region corresponding to a region in which the small dot group was present on the original.

The other inventions will be clear from embodiments.

Further features of the present invention will become apparent from the following description of exemplary embodiments (with reference to the attached drawings).

BRIEF DESCRIPTION OF THE DRAWINGS

FIG. 4 is a diagram illustrating an original being divided into a plurality of regions;

FIG. 13 is a diagram illustrating characteristics of the information to be embedded in a first region and a second region;

DESCRIPTION OF THE EMBODIMENTS

To describe embodiments of the present invention, an information embedding/extracting technology using a LVBC is first described.

(LVBC)

As an example of the information embedding technology, a technology using a LVBC (Low Visibility Barcode) is described.

In the present embodiment, the printing device prints desired additional information (hereinafter called information to be embedded) together with a document image on a sheet such as a paper, OHP sheet, etc.

Generally, requirements for embedding information are as follows.

Capability of embedding information to be embedded having a sufficient amount of information on a sheet Capability of extracting the embedded information embedded using color material (toner, ink, etc.) on a sheet afterward without fail as digital information.

Durability against factors disturbing the extraction of the embedded information (rotation, expansion, compression or partial deletion of a document, signal deterioration by copying, dirt, or the like) in copying a document image onto a sheet.

Capability of extracting the embedded information in real-time or a similar speed in copying for preventing a document having embedded information indicating copy prohibition from being copied.

Figure 12:
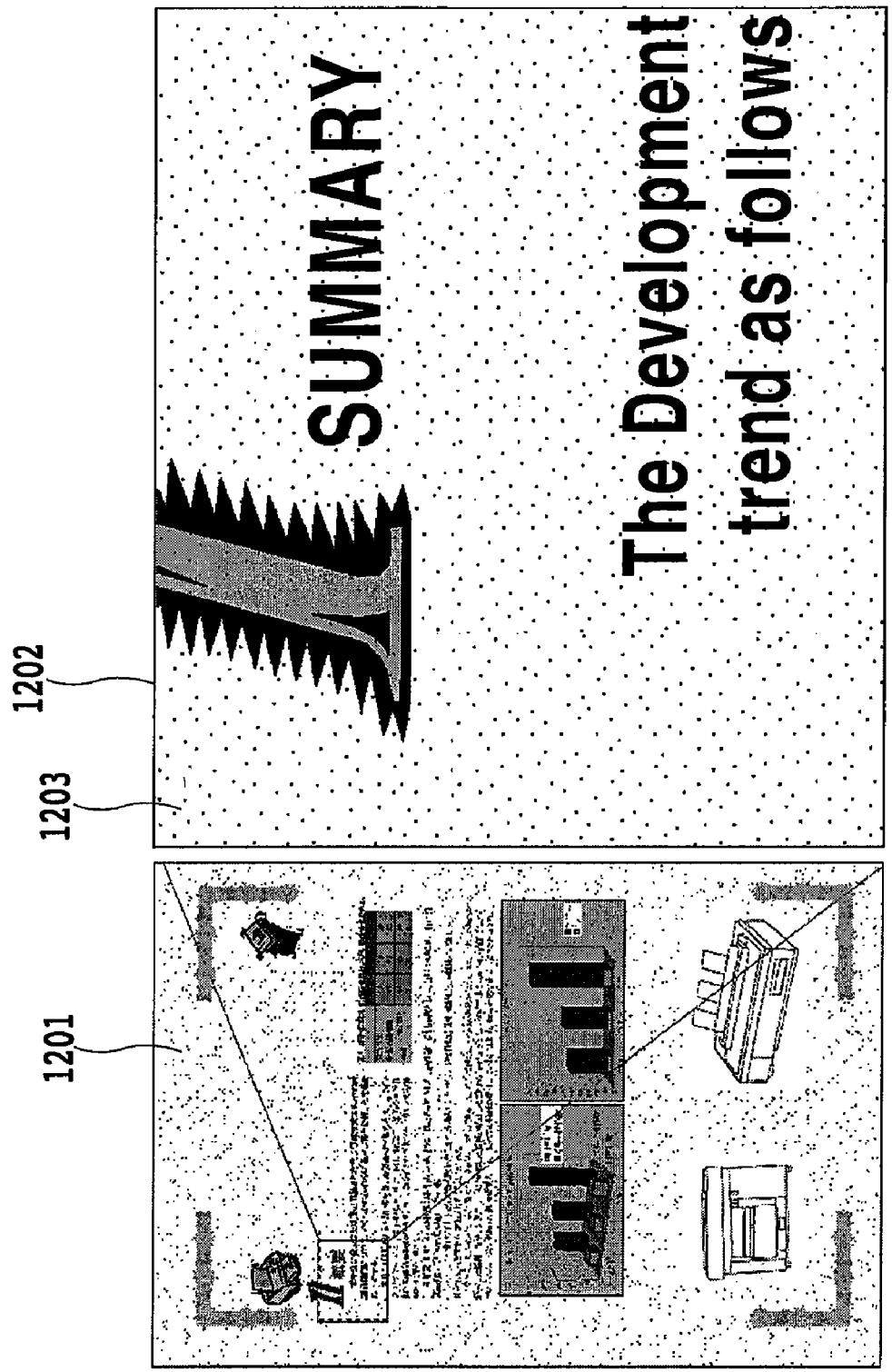
FIG. 12 is a diagram illustrating an example of a document having an embedded LVBC.

FIG. 12 is a diagram illustrating an example of a document having the embedded LVBC.

Reference numeral 1201 shows an entire sheet and Reference numeral 1202 shows an enlarged diagram of the sheet shown by Reference numeral 1201. With reference to the drawing shown by Reference numeral 1202, many dots 1203 are printed on the sheet other than an image originally drawn on a document. In the information embedding technique using the LVBC, the information to be embedded is embedded in a sheet via these dots.

(Two Regions for Embedding the Information to be Embedded)

Next, a region for embedding the information to be embedded will be described. The region is divided into a first region and a second region.

FIG. 13 is a diagram illustrating characteristics of the information to be embedded in the first region and the second region.

The information to be embedded is classified into two kinds of information to be embedded having different characteristics. The respective kinds of information to be embedded are embedded in the first region and the second region separately so as to be extracted individually.

In the first region, there is embedded information to be extracted in real-time by usual scanning in copy operation such as the location information of an electronic document to be printed, print parameter information (N-up, resolution, compression and decompression, etc.), security information and the like. The extraction processing of the information embedded in the first region is always performed and delay of the extraction of the embedded information affects the total copy speed. Accordingly, analyzing the embedded information requires a speed similar to the scan speed, for example. Meanwhile, such information may have a small amount of information and the data size thereof may be small.

In the second region, there is embedded search information. The search information is, for example, object coordinate information in a page or a keyword, and used for object search. The search information is not used in the usual copying and extraction of the search information does not affect the copy speed. The search information extraction is not necessarily carried out in real-time and therefore analysis speed of the search information may be comparatively slow. Accordingly, the search information can include a lot of information.

For the LVBC in the present embodiment, in order to deal with such embedded information having different characteristics, the information to be embedded is embedded in a region where the first region and the second region are mixed. Further, the present embodiment selects three types of extraction depending on applications: extraction only from the first region, extraction only from the second region, and extraction from both of the regions. When the embedded information is extracted only from the first region, the extraction is carried out in a speed not to affect productivity of the copy operation by improving the analysis speed.

Figure 14:
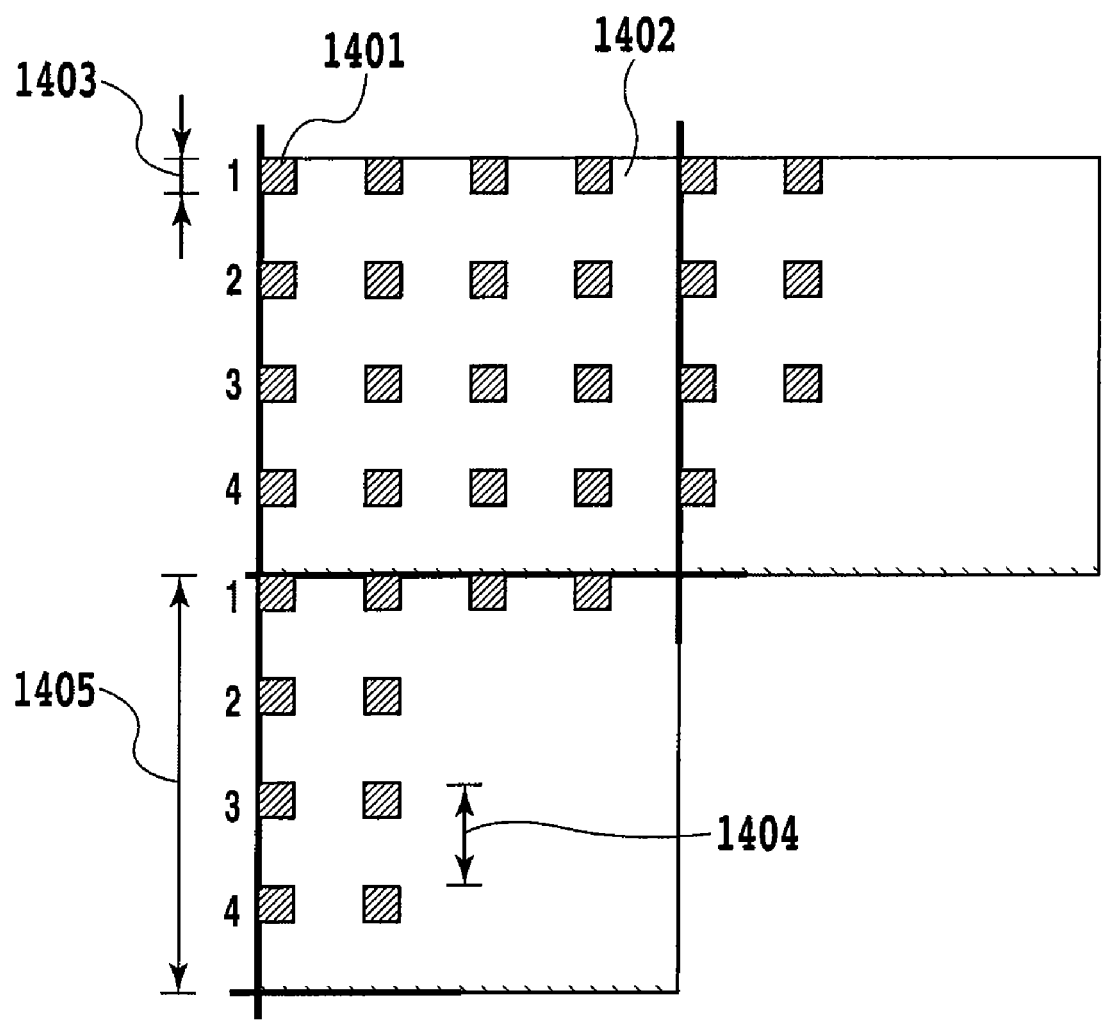
FIG. 14 is a diagram for illustrating arrangements of the first region and the second region.

FIG. 14 is a diagram for illustrating arrangements of the first region and the second region.

A square region indicated by Reference numeral 1401 shows the first region. While a plurality of same square regions is arranged periodically, the same information to be embedded is stored in each of the regions. By embedding the same information in the plurality of first regions in this manner, it is possible to improve redundancy of the embedded information and thereby to strengthen durability of the embedded information against noise or errors. Reference numeral 1403 and Reference numeral 1404 indicate a first region size and a first region repetition period, respectively.

A square indicated by Reference numeral 1402 shows the second region. The second region has a plurality of periodically arranged same square regions similarly to the first region. The above described two particular different kinds of information are embedded in the first region 1401 and the second region exclusively. Reference numeral 1405 indicates a second region size.

(LVBC Embedding Method)

Next, an embedding method of the LVBC will be described.

In an information embedding method using the LVBC, a hypothetical grid is used.

The information to be embedded is binary data within a certain size. The information to be embedded is embedded on a sheet as information by displacing a dot upward, downward, rightward, or leftward into any of eight directions from a grid point (shift disposition from a grid point).

Figure 15:
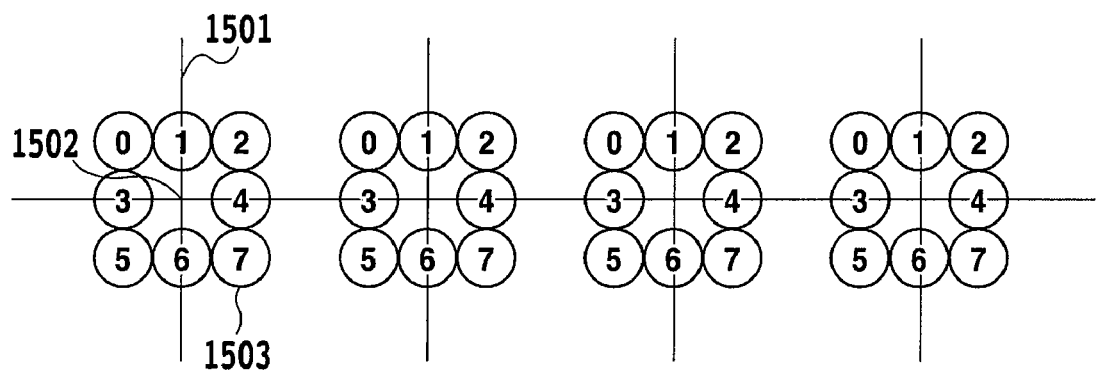
FIG. 15 is a diagram illustrating a positional relationship between a grid point and a dot disposition position.

FIG. 15 is a diagram illustrating a positional relationship between the grid point and the dot disposition position.

In FIG. 15, vertical and horizontal lines 1501 show the grid. Reference numeral 1502 indicates a grid point. The dot is not disposed at the grid point 1502. For example, the dot is disposed at a position apart from the grid point 1502 in the lower right direction.

Figure 16:
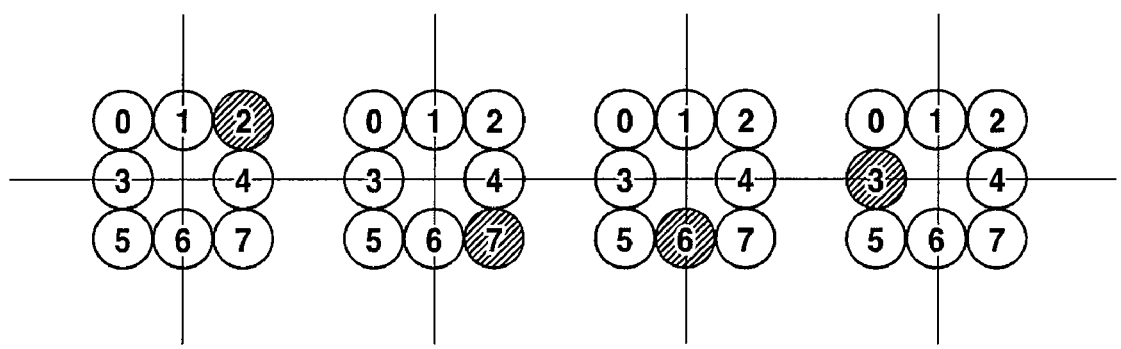
FIG. 16 is a diagram illustrating an example in which binary data of 010111110011 is embedded for the information to be embedded.

FIG. 16 is a diagram illustrating an example in which binary data of 010111110011 is embedded for the information to be embedded.

When the binary data of 010111110011 is embedded, the binary data is divided into three-bit units such as 010, 111, 110, and 011. Then, each of the three-bit units is converted from a binary number to a decimal number to obtain 2, 7, 6, and 3.

The information to be embedded is embedded by displacing each dot upward, downward, rightward, or leftward, into any of the eight directions from the grid point, according to the number expressing the information to be embedded. For example, when 2, 7, 6, and 3 are embedded as the information to be embedded, respective dots are displaced to the upper right, lower right, lower, and left. In FIG. 16, black circles indicate the dots. In the information embedding method using the LVBC, by repeating the above described embedding, it is possible to embed the information to be embedded having a information amount of about 2,000 Bytes into a sheet. Further, by embedding these dots representing the embedded information over the entire sheet, it is possible to improve the redundancy of the embedded information and to strengthen the durability against dirt on a sheet, and wrinkles and partial destruction of a sheet.

For analyzing the LVBC, first, a position of the grid needs to be detected accurately. Accordingly, it is preferable to make the dots representing the embedded information appear in the eight directions from the grid point with the same probability. However, when a particular value such as zero are frequently embedded as the information to be embedded, the dots representing the embedded information may not appear in the eight directions with the same probability. Accordingly, in the information embedding method using the LVBC, the information to be embedded is provided with scramble processing (e.g., common key cryptographic processing) having reversibility for the embedded information to obtain random dot displacements.

The information embedding method using the LVBC is considered to be a DA conversion which records digital data of the information to be embedded on a sheet as analog data, and can be realized by a relatively simple configuration.
(LVBC Analyzing Method)

Next, a LVBC analyzing method will be described.

Figure 17:
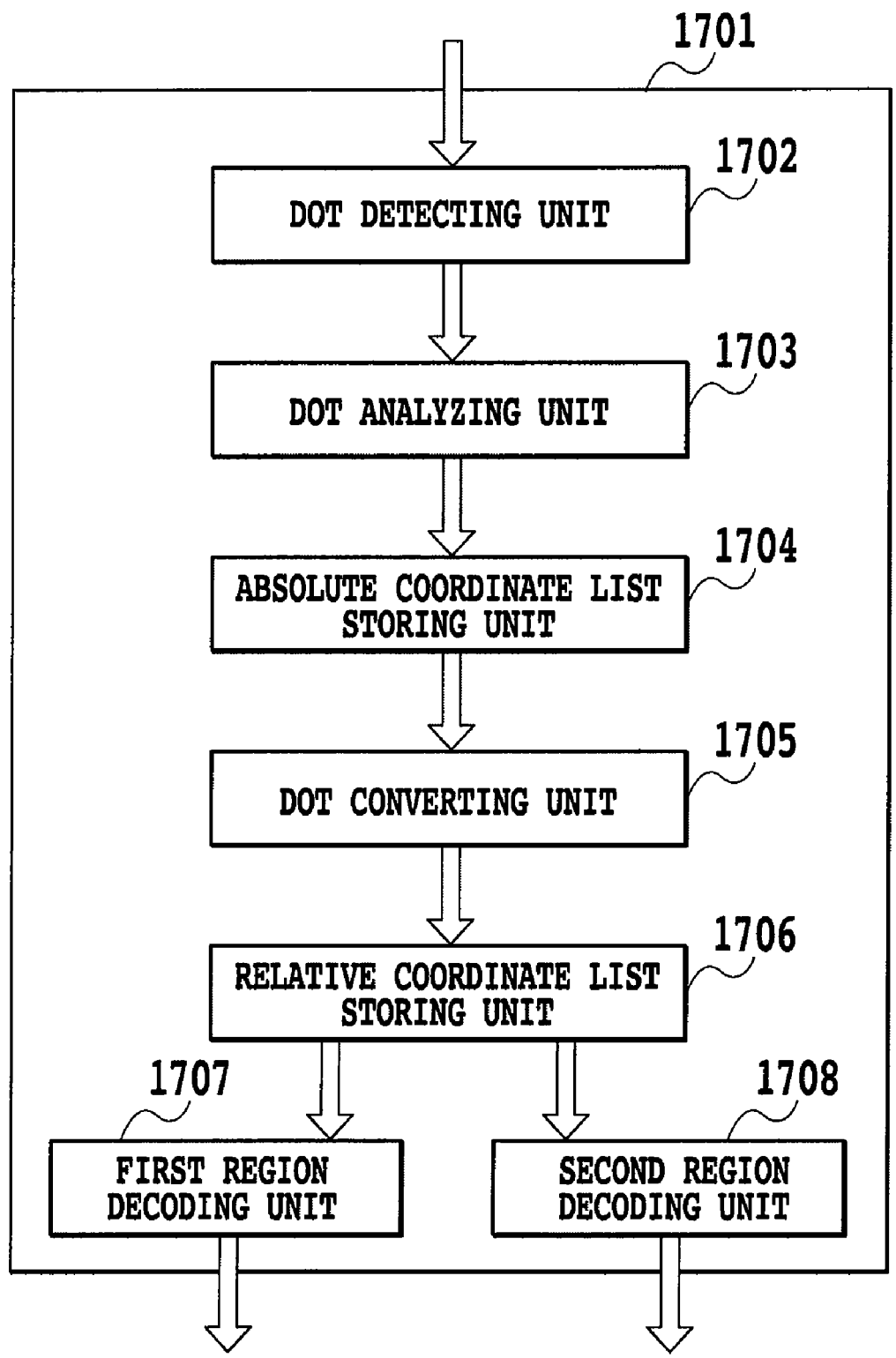
FIG. 17 is a block diagram illustrating a configuration of an embedded information analyzing unit 1701 analyzing the LVBC.

FIG. 17 is a block diagram illustrating a configuration of an embedded information analyzing unit 1701 analyzing the LVBC.

A dot detecting unit 1702 detects arbitrary dots from an image having the embedded information (image in which an original image and the embedded information are mixed) and obtains coordinate positions of the dots.

A dot analyzing unit 1703 removes unnecessary dots such as dots composing a halftone or the like from the dots detected by the dot detecting unit 1702.

An absolute coordinate list storing unit 1704 stores a list of the absolute coordinate positions of the dots.

A dot converting unit 1705 detects a rotation angle and a grid interval from the absolute coordinate position list stored in the absolute coordinate list storing unit 1704, and coverts the absolute coordinate positions into relative coordinate positions from the grid positions.

A relative coordinate list storing unit 1706 stores the relative coordinate positions.

A first region decoding unit 1707 extracts the embedded information embedded in the first region and outputs the extracted embedded information to a subsequent stage module.

A second region decoding unit 1708 extracts the embedded information embedded in the second region and outputs the extracted embedded information to the subsequent stage module.

The subsequent stage module is a functional module utilizing the embedded information, for example, a module changing the embedded information into a background image again to output a combined image or a module acquiring document information to perform reprint processing.
(Dot Detection)

Processing by the dot detecting unit 1702 will be described in detail.

The dot detecting unit 1702 receives an image scanned by the optical scanner in a format of a multi-value monochrome image. Meanwhile, the information to be embedded is embedded by binary monochrome dots in the information embedding method using the LVBC. Therefore, the dot detecting unit 1702 receives the signal in a slightly deteriorated state caused by influences of an attached toner amount in the information embedding, sheet handling, an optical system for scanning, etc. Accordingly, the dot detecting unit 1702, for eliminating these influences, recognizes the coordinate position by a received centroid position of the dot to improve detection accuracy.

Figure 18:
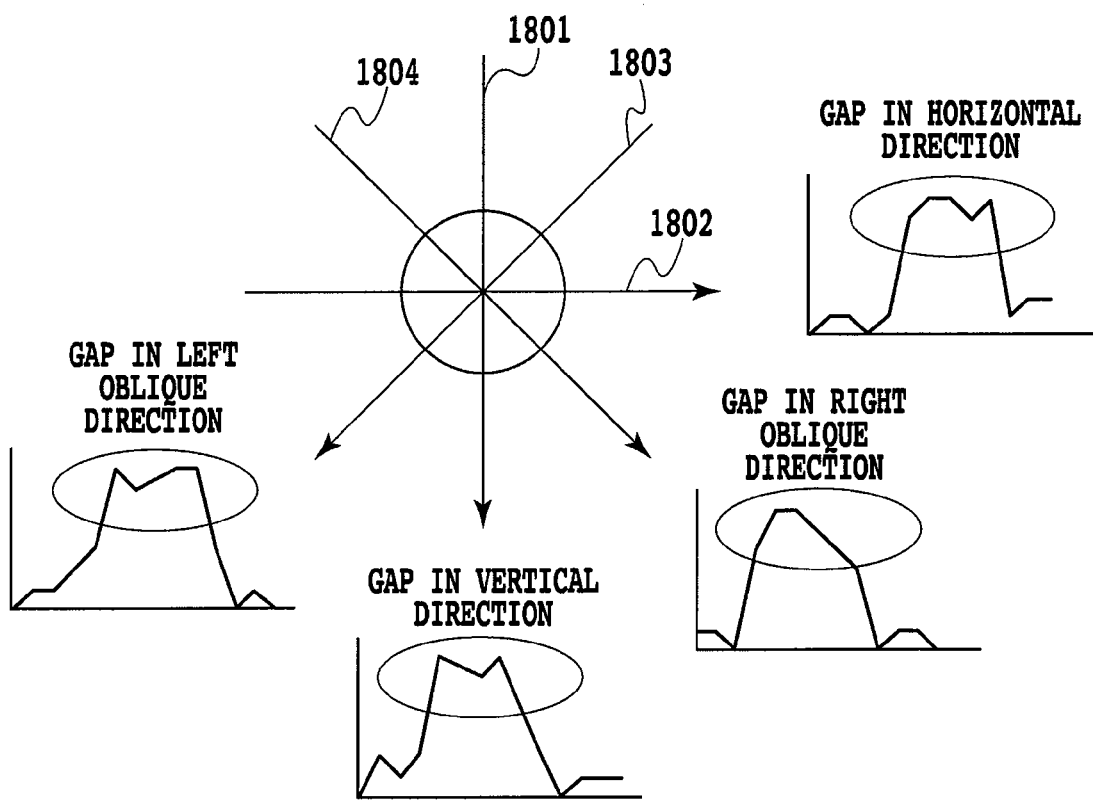
FIG. 18 is a conceptual diagram for illustrating dot detection by a dot detecting unit 1702.

FIG. 18 is a conceptual diagram for illustrating the dot detection by the dot detecting unit 1702.

The dot detecting unit 1702 performs gap inspection against the image along four directions for examining an isolated point on the image. Reference numerals 1801 to 1804 indicate the directions for examining whether an isolated point exists or not. For example, when an inspection result along a vertical direction 1801 is "white", "white", "black", "black, "white", and "white", the black portion is probably an isolated point. In this inspection alone, however, there remains a possibility that the isolated point is located on a horizontal line. Similarly, even when an isolated point is determined probably to be located on a horizontal line in an inspection result along the horizontal direction line 1802, there is a possibility that the isolated point is actually located on a vertical line. Accordingly, the dot detecting unit 1702 improves the detection accuracy by carrying out the isolated point inspection along the four directions 1801 to 1804. When the above described inspection results are obtained along all of the four directions 1801 to 1804 in a certain region, the black portion is recognized to be an isolated point.
(Dot Analysis)

Processing by a dot analyzing unit 1703 will be described in detail.

There is a case the dot detecting unit 1702 detects a dot other than a dot composing the LVBC. For example, a dot pattern expressing a halftone included in a document image, an isolated point originally included in a document (e.g., a voice sound mark of a Japanese syllabary character), or the like corresponds to the case. Accordingly, it is necessary to remove the halftone for eliminating the dot which is not a dot composing the LVBC.

Figure 19:
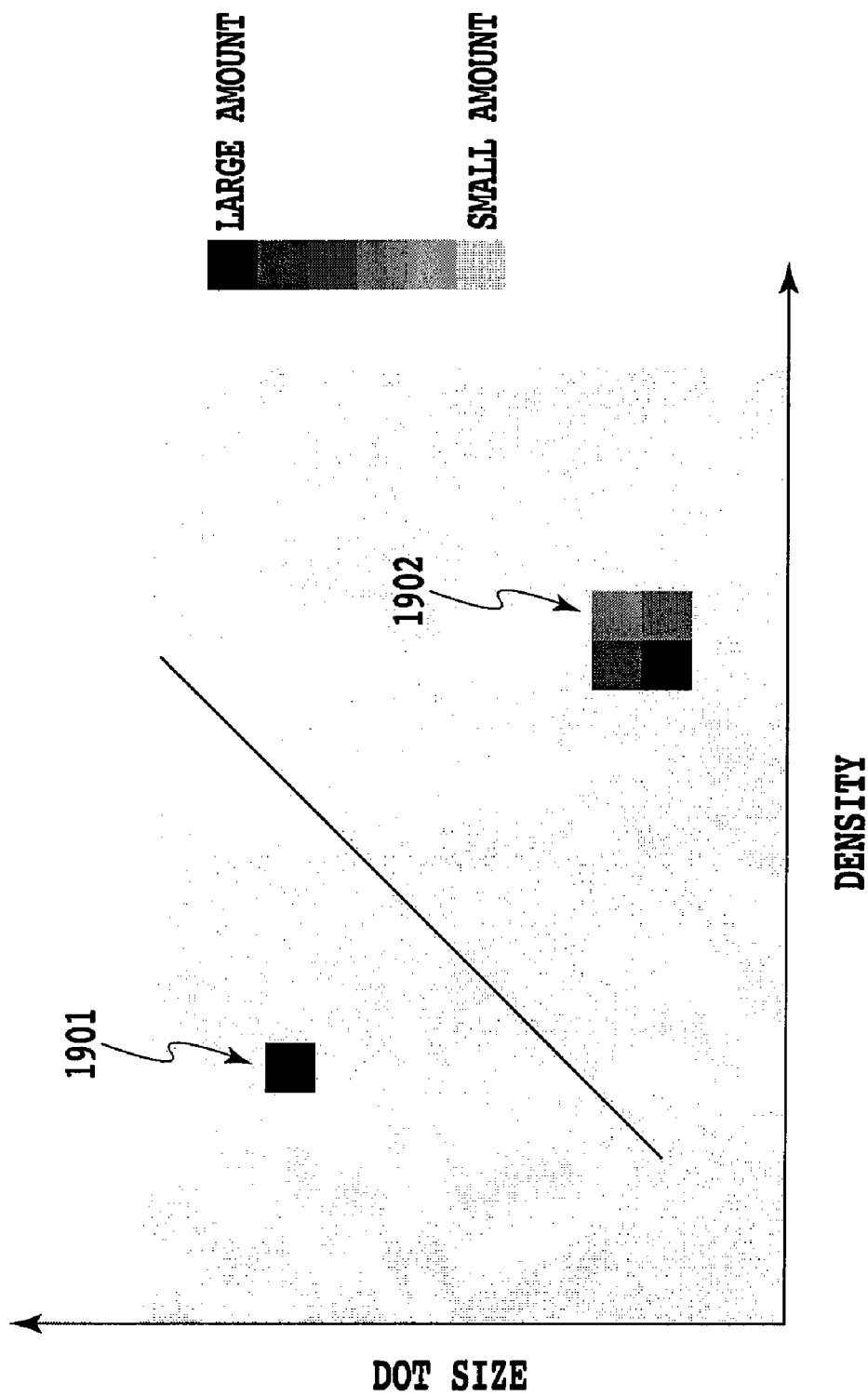
FIG. 19 is a diagram illustrating a graph for illustrating halftone removal.

FIG. 19 is a diagram illustrating a graph for illustrating the half tone removal.

The vertical axis of the graph indicates a dot size and the horizontal axis thereof indicates dot density. Also a histogram is shown in the graph to express a frequency of the dots by dot density. It is shown there that a dot appearance frequency is higher when the dot density is higher (darker). For the LVBC, the dots are embedded to have the same size and the same density and the dot appearance frequency has a peak in a narrow region in the graph (1901). On the other hand, for the halftone, the dot size and the dot density are not regulated, and the dots appear sparsely in a wide region of the graph and an appearance frequency thereof is relatively low. Therefore, the dot analyzing unit 1703, by utilizing this characteristic, determines dots having an appearance frequency peak in a narrow range in the graph to be the dots of the LVBC and eliminates other dots. Accordingly, the absolute coordinate list storing unit 1704 stores only the LVBC dots.
(Dot Conversion)

Processing by a dot converting unit 1705 will be described in detail.

An image angle in the scanning is different from an image angle when LVBC dots have been embedded in the printing, because of a difference in a sheet direction in the scanner or a slight shift of a sheet angle in an analog level. Therefore, it is necessary to perform rotation angle detection and angle correction of an image. Also, since the LVBC embeds information by displacing dots composing a grid upward, downward, rightward, and leftward, in eight directions, it is necessary to reconstruct the original grid. Therefore, it is necessary to identify the original grid interval accurately.

Figure 20:
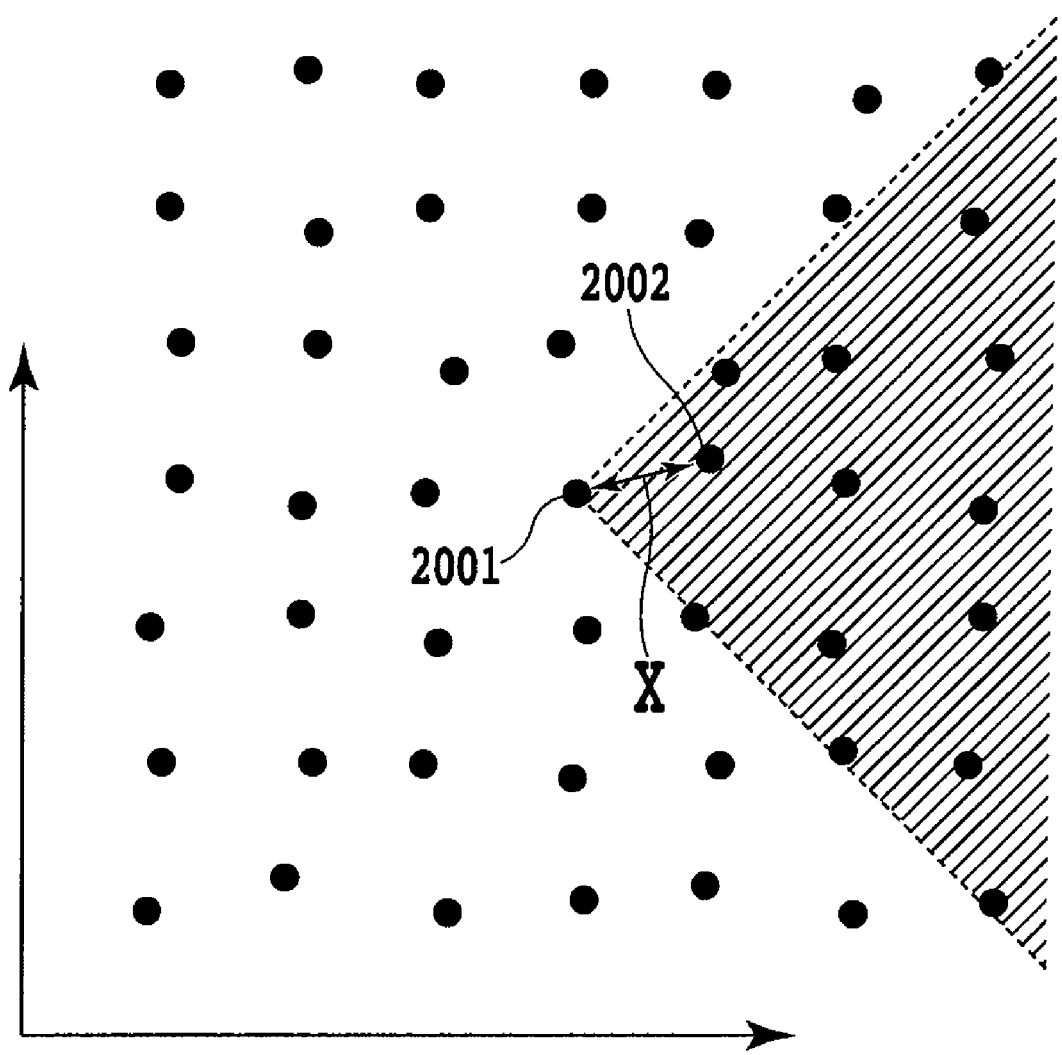
FIG. 20 is a schematic diagram illustrating a method of measuring a grid interval.

FIG. 20 is a schematic diagram illustrating a method of measuring the grid interval.

Focusing on a dot 2001, a distance X from the dot 2001 to a dot 2002 nearest to the dot 2001 is close to the grid interval.

While there are four dots located near the dot 2001 upward, downward, rightward, and leftward, only a dot located on the right side of the dot 2001 in a range of 90 degrees is made a candidate for the dot nearest to the dot 2001 for reducing a calculation amount. Specifically, when a relationship between a focused dot (x, y) and another arbitrary dot (a, b) satisfies $$a-x \leq 0 \text{ or } |a-x| \leq |b-y|,$$

the dot (a, b) is eliminated from the candidate. Then, a dot (a, b) having the smallest distance from the dot (x, y) is chosen to be the neighboring dot and the distance between the two dots X is made a candidate for the grid interval.

Here, the focused dot 2001 and also the neighboring dot 2002 are displaced. Also, dots recognized as dots of the LVBC actually might be dots of the halftone which the dot analyzing unit 1703 has failed to eliminate. Accordingly, the grid intervals are measured for all the focused dots (x, y) as described above and a histogram is generated expressing frequencies of the grid intervals for all the focused dots (x, y).

Figure 21:
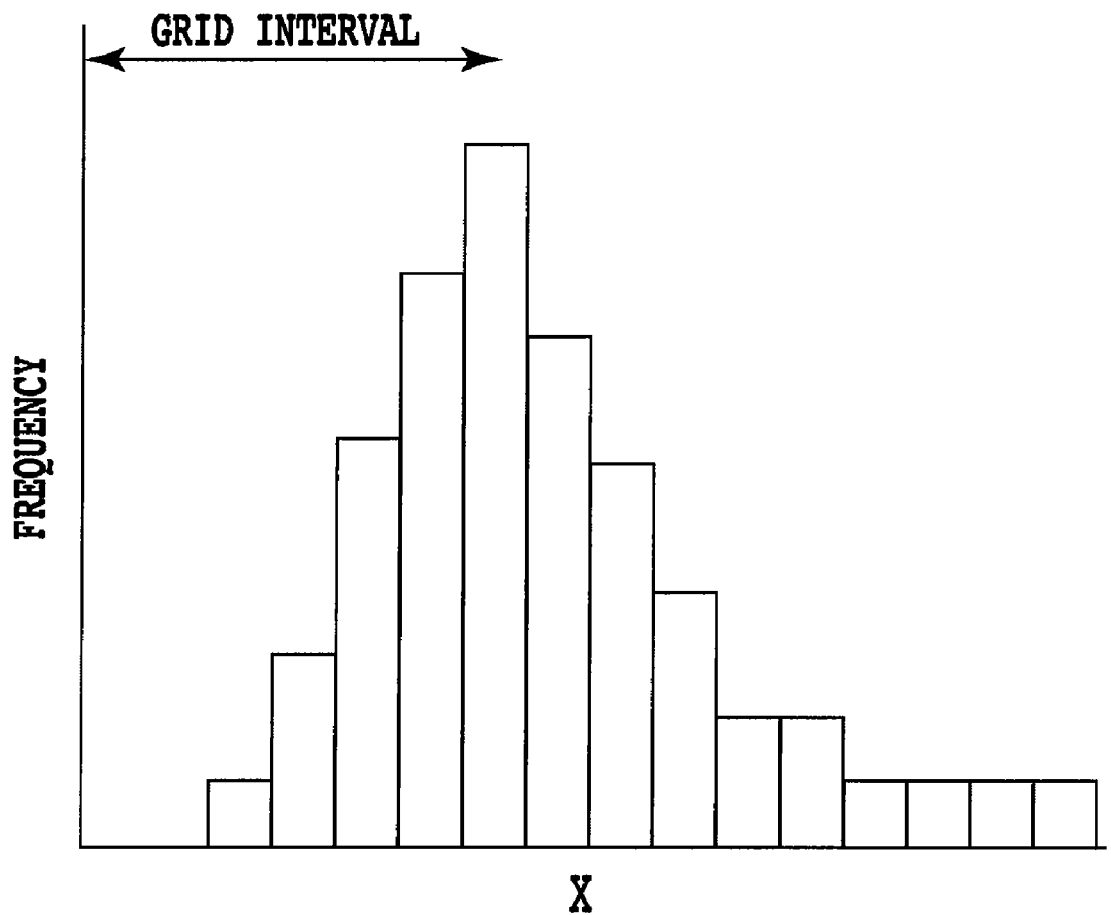
FIG. 21 is a diagram illustrating an example of a histogram expressing a frequency of grid intervals.

FIG. 21 is a diagram illustrating an example of the histogram expressing frequencies of the grid intervals.

In FIG. 21, the horizontal axis expresses a distance value which is a candidate for the grid interval, and the vertical axis expresses a frequency in which the distance is measured at the focused dots (x, y). The drawing shows that the distance X having the highest frequency is recognized to be the grid interval. That is, assuming that appearance probabilities of the focused dot 2001 and the neighboring dot 2002 is the same in both of the vertical and horizontal directions, it is possible to determine the distance X having the highest frequency to be the grid interval from the histogram of a number of focused dots.

Figure 22:
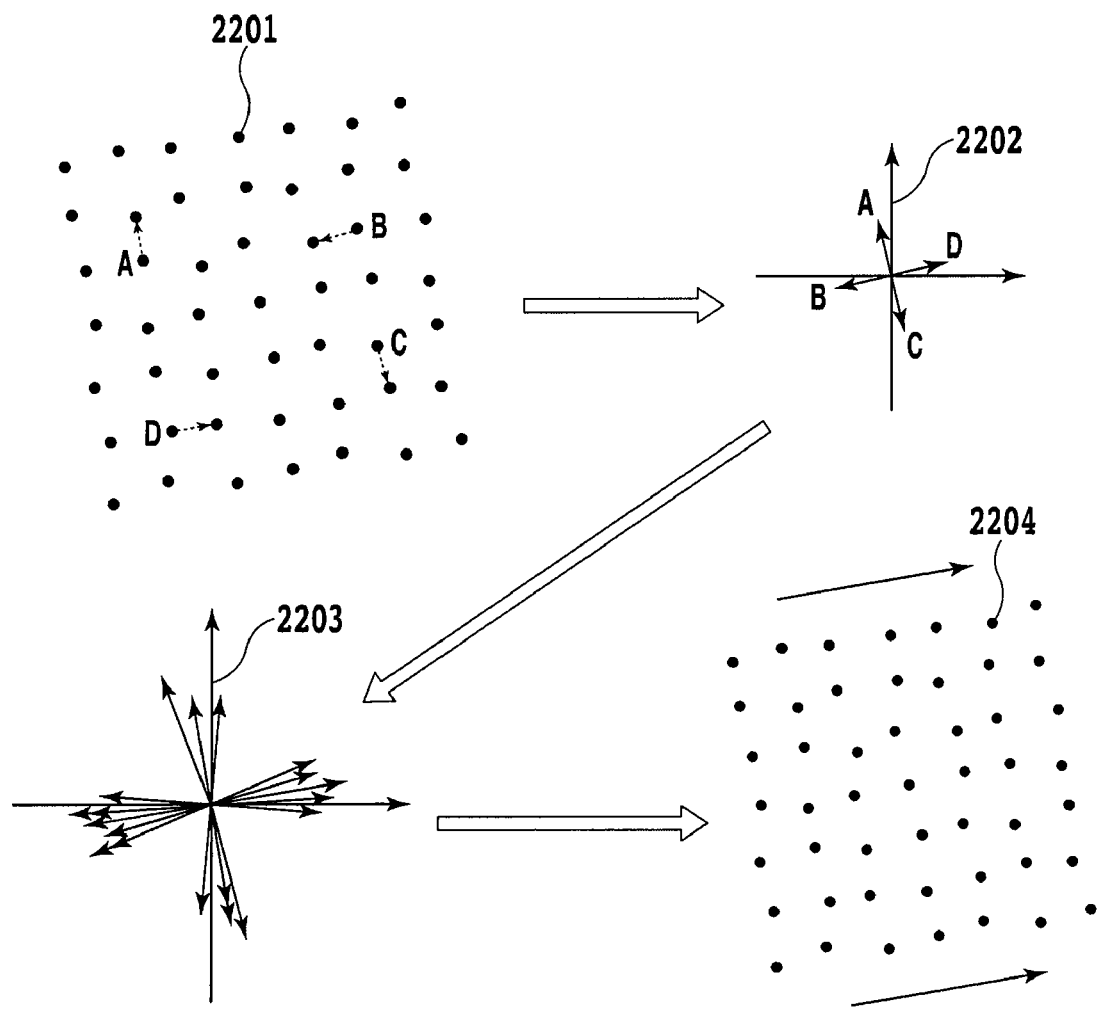
FIG. 22 is a diagram illustrating correction of a grid rotational angle.

FIG. 22 is a diagram illustrating correction of the grid rotation angle.

An angle from a dot to the neighboring dot thereof is measured for every dot in the drawing 2201.

Originally, an angle from a focused dot to the neighboring dot thereof should be any of 0, 90, 180, and 270 degrees and therefore it is possible to determine a rotation angle by correcting shifts of the measured angles. An angle θ from an individual focused dot to the neighboring dot is expressed by the following formula by defining a vector (dx, dy) from the focused dot to the neighboring dot thereof.

$$\theta = a \tan 2(dy, dx)$$

The drawing 2202 shows vectors to the respective neighboring dots, A, B, C, and D. Since the focused dots and also the neighboring dots are actually displaced slightly from the grid points, it is necessary to measure θ for every focused dot. Assuming that appearance probabilities of the displaced positions from the respective grid points of the focused dot 2201 and the neighboring dot thereof are the same in the vertical and horizontal directions, it is possible to measure the rotation angle of the grid in average by summing up angle shifts of all the focused dots. The drawing 2203 shows vectors of several dots and implies that the grid rotation angle can be approximated by overlapping these vector angles.

Specifically, the basic vector is calculated again from θ of each focused dot and a total angle φ is obtained from a summing up result of all the basic vectors. The summing up result (A, B) of the basic vectors is given as follows.

$$A = \sum_i \cos(4\theta_i)$$

$$B = \sum_i \sin(4\theta_i)$$

The grid rotation angle φ is approximated by the following formula.

$$\phi = a \tan 2(B, A)$$

For the absolute coordinate list stored in the absolute coordinate list storing unit 1704, grid angles are corrected by carrying out reverse rotation of the grid rotation angle.

A correction value of the rotation angle, while narrowed down to a rotation angle from every 90 degrees, is not yet narrowed down to a rotation angle from any of four angles, 0 (correct), 90, 180, or 270 degrees. This further narrowing-down will be described hereinafter.

Figure 23:
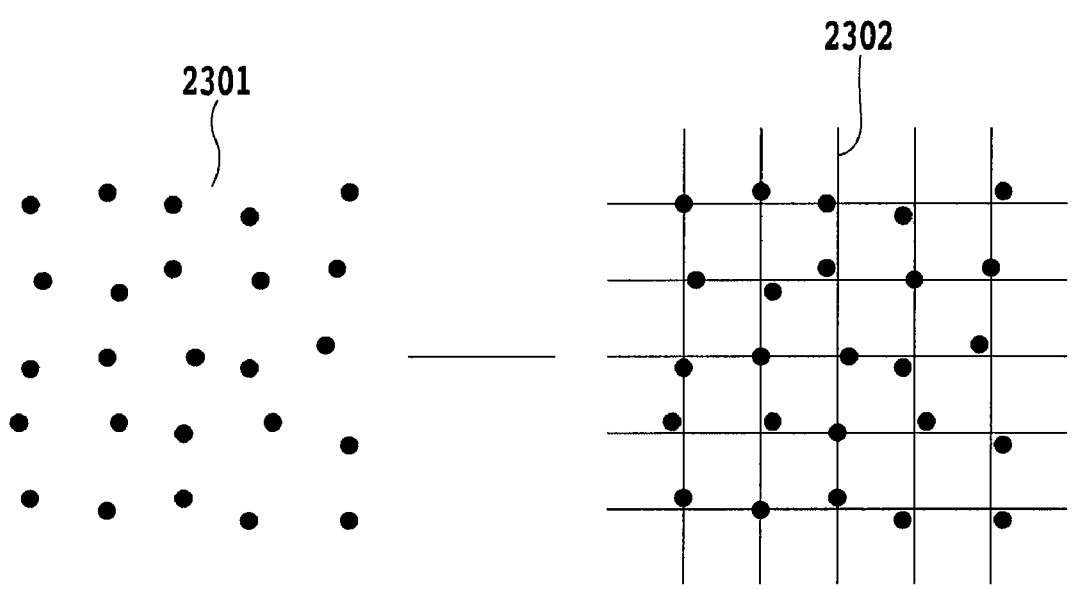
FIG. 23 is a diagram illustrating a rotation correction result and grid points.

FIG. 23 is a diagram illustrating a rotation correction result and the grid points.

In FIG. 23, the drawing 2301 shows the absolute coordinate list of the LVBC dots after the rotation correction thereof has been completed. Further, as shown in the drawing 2302, hypothetical lines are drawn in every grid interval obtained in the dot converting unit 1705 in the X direction and Y direction, respectively, and intersections of the lines are assumed to be grid points. The displacement of dot coordinates is measured from this grid point.

(Identification of the First Region)

There will be described processing to identify the first region size 1403 and region repetition period 1404 shown in FIG. 14, and the first region position.

First, the repetition period 1404 of the first regions 1401 is determined. The first regions 1401 include the same data periodically and, when an autocorrelation is measured against the vertical direction with a certain offset, the autocorrelation becomes strong at an offset value equal to the repetition period 1404 to determine the repletion period 1404.

Figure 24:
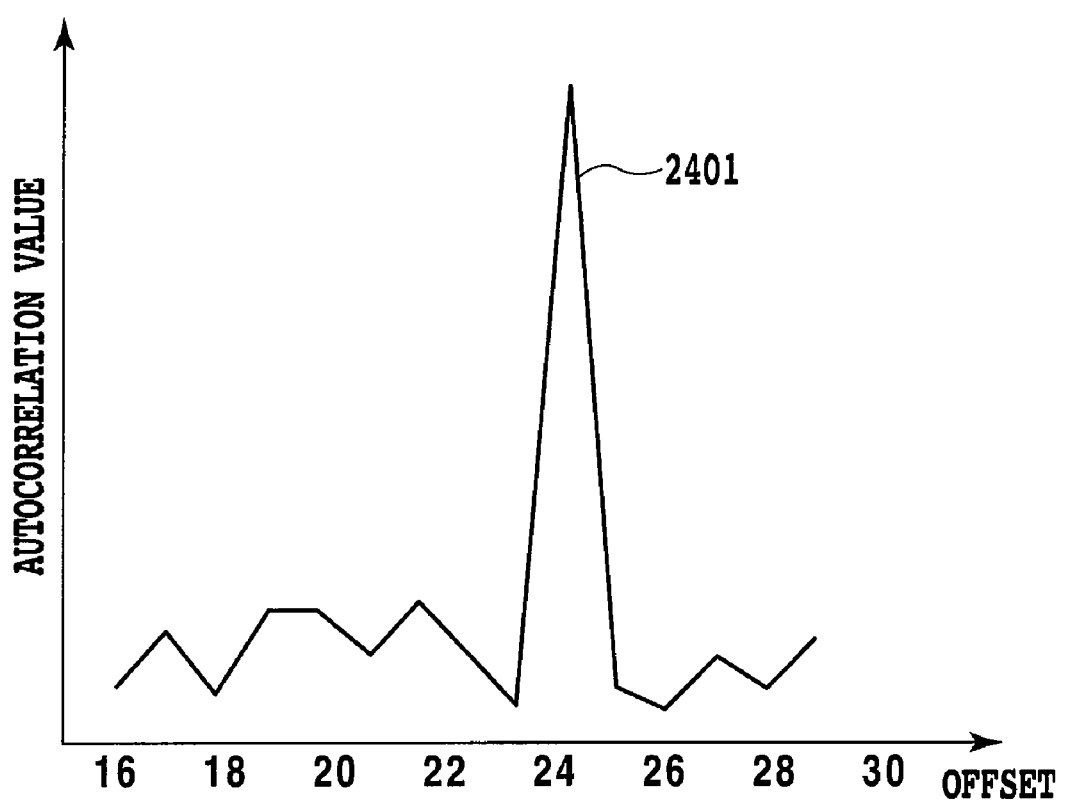
FIG. 24 is a graph illustrating an example of calculated autocorrelation values against offset values.

FIG. 24 is a graph illustrating an example of calculated autocorrelation values against offset values.

The autocorrelation is a method to evaluate a frequency of particular embedded data appearing periodically and the autocorrelation value is a value to evaluate similarity of the embedded data at a particular offset value.

An autocorrelation function COR (A, B) for calculating the autocorrelation value is given by the following arithmetic expression.

$$COR(A, B) = \text{bitcount (not } (A \text{ xor } B)),$$

where "xor" indicates an exclusive OR of two terms and "not" indicates negation.

"bitcount" is a function to count the number of 1 in a bit sequence.

For example, when A is 010b and B is 011b, not (A xor B)=not (001b)=110b and "bitcount" becomes 2.

Here, it is assumed that the first region is a matrix having predetermined width and height and a bit sequence for evaluating the first region is CELL (x, y), where x and y are vertical and horizontal coordinates, respectively. For example, when the first region size is 8 in width and 8 in height, CELL (x, y) has a bit sequence length of 3 bits×8×8=192 bits for the first region having (x, y) at an upper left corner.

Here, the autocorrelation value for all the coordinates at a certain offset is expressed by the following function.

$$\text{Autocorrelation value (Offset)} = \Sigma_x \Sigma_y (COR(\text{CELL}(x, y), \text{CELL}(x, y\text{-offset})))$$

When the autocorrelation is calculated assuming that the first region size 1403 is 8 and the repetition period 1404 is 8×3=24, for example, the autocorrelation value has a peak 2401 at an offset of 24 and it is possible to determine the offset value of 24 to be the repetition period 1404.

Next, the position and size of the first region 1401 are determined. While the repetition period of the first regions has been determined by a measurement of the autocorrelation, it is necessary to determine a position in the period where the first region exists and the size of the first region.

Figure 25:
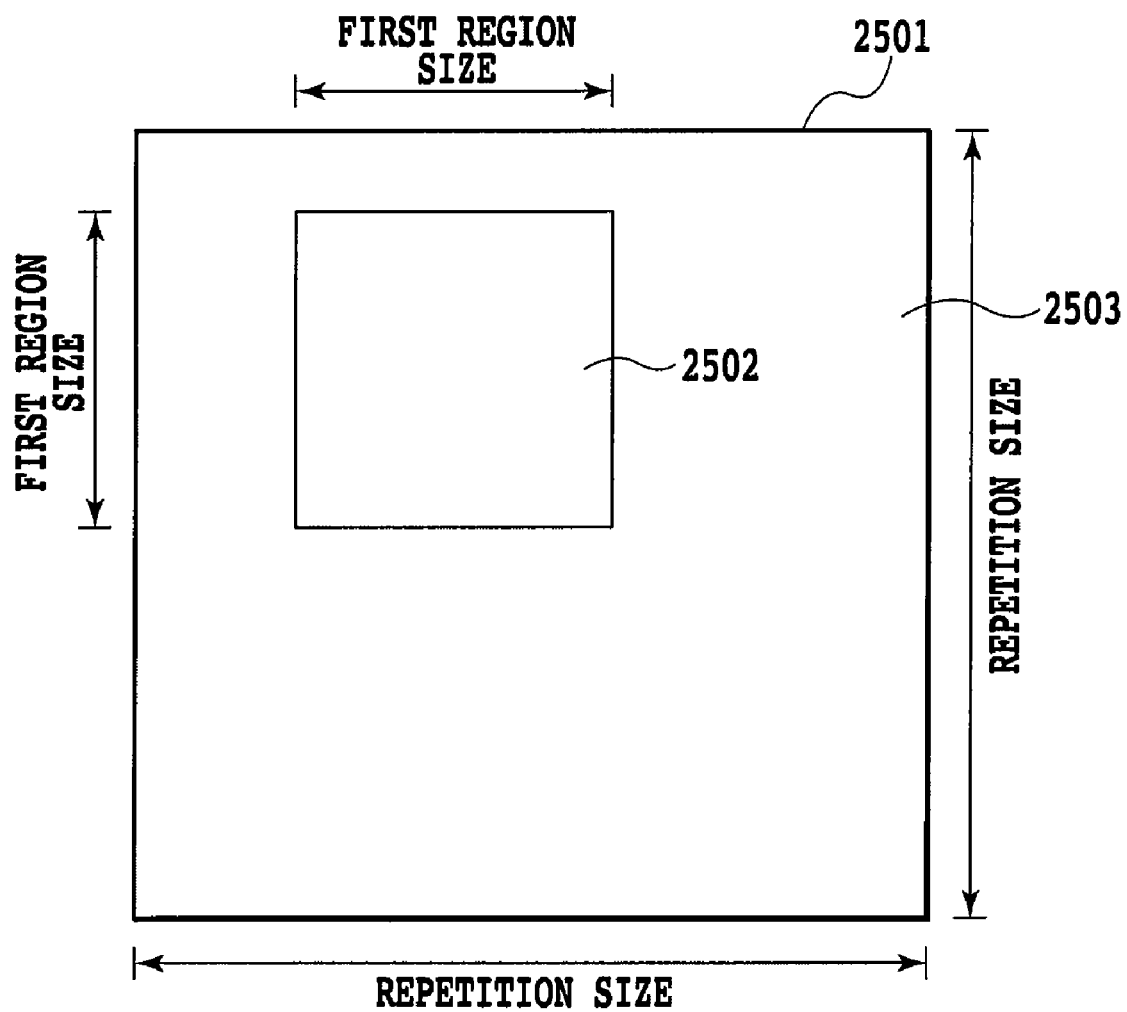
FIG. 25 is a diagram for illustrating a method of determining a position of the first region.

FIG. 25 is a diagram for illustrating a method to determine the position of the first region.

Since the repetition period of the first regions has been already determined, an arbitrary regions having the same repetition period is cut out from the relative coordinate list storing unit 1706. Subsequently, a correlation is measured in regions neighboring on the regions, then a correlation is measured in further neighboring regions, and such processing is repeated. In this processing, portions of the first region 2502, where the same data appears in the repetition period, show a strong correlation. Other regions in the second region 2503, where the same data does not appear in the repetition period, show a weak correlation. Utilizing these characteristics, a start position of the portions having a strong correlation is identified to be a start position of the first region and a size to an end point of the portions having the strong correlation is determined to be a size of the first region.

(Decoding of the First Region)

The data in the first region is decoded using the position and size of the first region identified in the above described processing.

When only data in a single region is decoded, there is a possibility of misjudgment caused by measurement errors or noise. Accordingly, the positions of the dots embedded in all the first regions are counted, the most frequent value is employed and an occurrence probability of the value is calculated.

Figure 26:
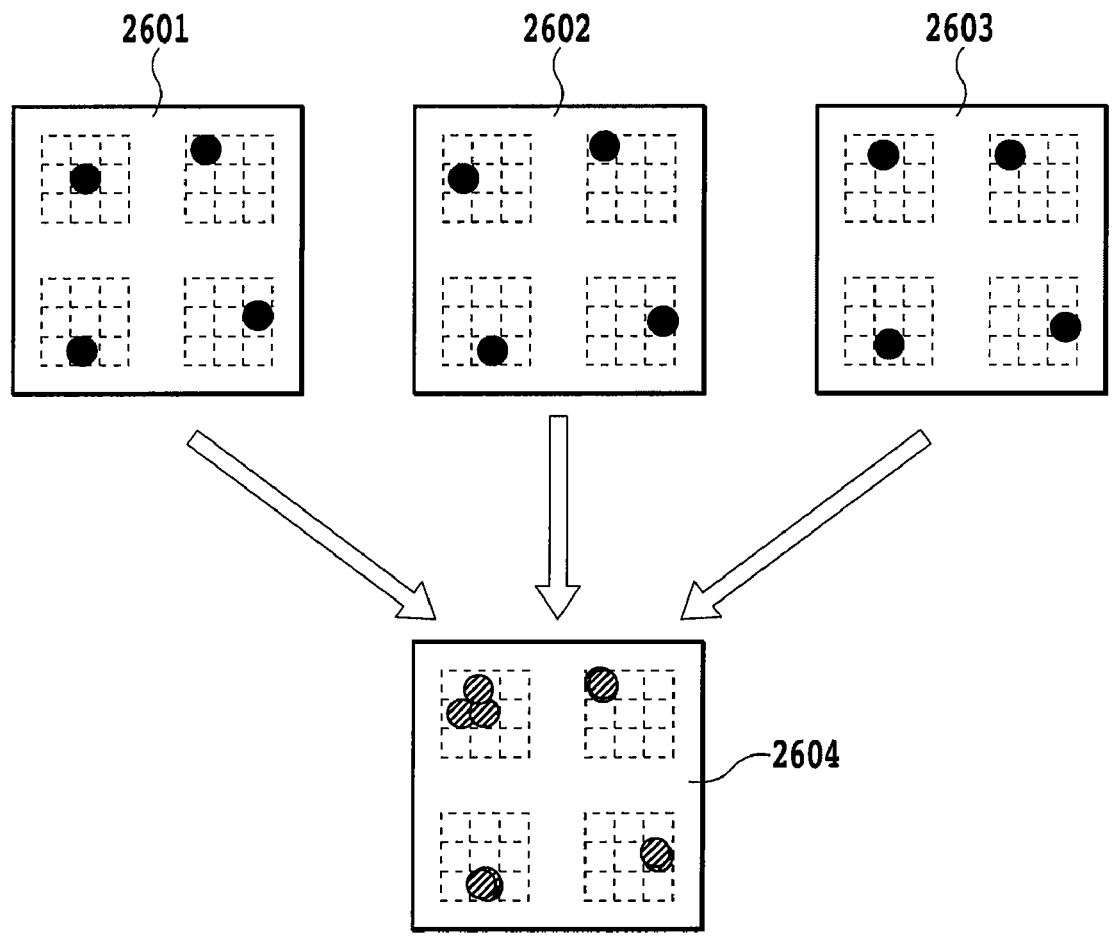
FIG. 26 is a schematic diagram for illustrating counting of the first region.

FIG. 26 is a schematic diagram for illustrating position counting of the dots embedded in the first regions.

In FIG. 26, Reference numerals 2601 to 2603 indicate the first regions located in different positions on a sheet. Reference numeral 2604 shows a result overlapping these first regions. While some shifts caused by noise or errors are recognized, the most frequent value is determined from a counting result of all the regions and therefore this value can be utilized.

Next, substantial decoding processing is performed. In this stage, influence of noise or measurement errors can not be perfectly eliminated, and the decoding processing is performed providing error correction processing to the decoded result.

First, the dot positions are detected from the dot patterns shown in FIG. 16 and converted into data corresponding to the positions, and a data sequence embedded in the first regions is extracted. In this data sequence, an error correction code, which detects data destruction and repairs the data destruction if possible, is recorded in the embedding other than copy prohibition data for an actual use.

While many error correction codes have been developed as well known techniques, this embodiment employs the LDPC (Low Density Parity Check) method. The LDPC is known to have a high error correction capability and to show characteristics close to the Shannon limit. Detailed description of the LDPC will be omitted. Also, any method other than the LDPC may be used as far as a function of the error correction code is provided.

It is possible to extract the embedded data using the error correction code even when the extracted grid includes a certain extent of errors or noise.

Further, as described in the rotation angle correction, the rotation angle correction is performed every 90 degrees and therefore there are four possible cases; data extracted here is correct data, data rotated by 90 degrees, data rotated by 180 degrees, or data rotated by 270 degrees from the correct data. Accordingly, decoding is carried out for the potential results in no rotation, 90 degree rotation, 180 degree rotation and 270 degree rotation of the extracted data performing the error correction by the LDPC. The error correction code functions effectively only in a correct rotation angle and it is possible to extract the data in a normal manner.

Figure 27:
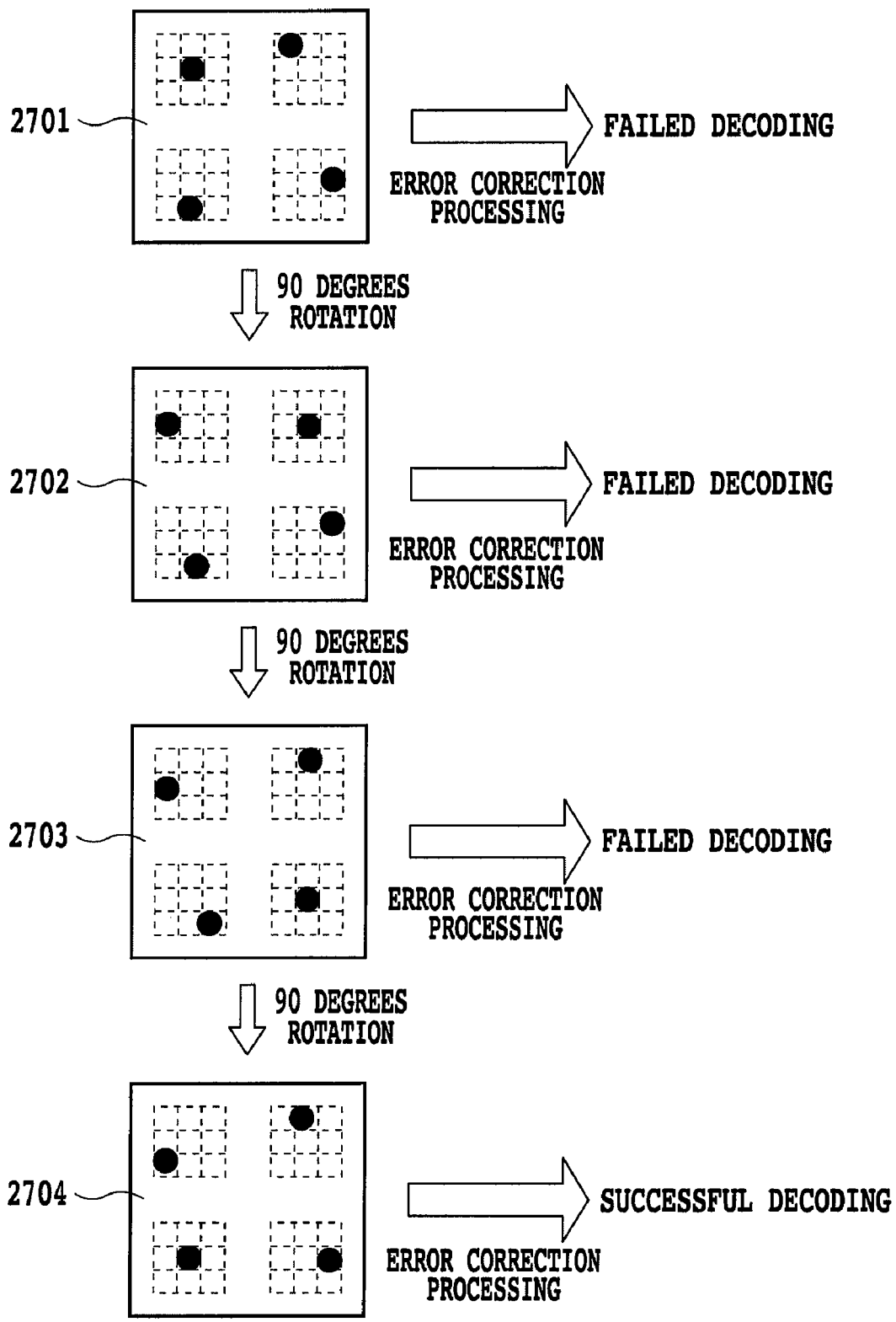
FIG. 27 is a diagram for illustrating decoding processing which performs error correction in consideration of rotation.

FIG. 27 is a diagram for illustrating decoding processing which performs the error correction in consideration of the rotation.

FIG. 27 shows an example in which the result of 270 degree rotation is extracted for the correct data. First, in the drawing 2701, the error correction processing is performed for the extracted data as is. While the correct data includes the error correcting code, the code becomes meaningless data by the rotation and can not correct errors. Then, in the drawing 2702, the error correction processing is performed for the data provided with a 90 degree rotation from the case shown in the drawing 2701. Similarly the error correction fails and the data can not be extracted. Then, in the drawing 2703, the error correction processing is performed for the data provided with a 90 degree rotation from the case shown in the drawing 2702. Similarly, the error correction fails and the data can not be extracted. Lastly, in the drawing 2704, the error correction is performed for the data provided with a 90 degree rotation from the case shown in the drawing 2703. Since this data is the correct data, the error correction succeeds and this data can be employed as an extracted data.

When the error correction has failed even in the drawing 2704, there is a possibility that the data extraction has failed because of a lot of errors or noise.

The embedded data stored in the first region can be extracted by the above processing.

(Identification of the Second Region)

The second region is a region used for registration of tracking information or the like and includes information which is not always required for performing copy operation. Accordingly, by omitting the decoding of the second region if not necessary, it is possible to suppress a speed reduction of the total processing.

An identification method of the second region will be described below.

First, similarly to the first regions, an autocorrelation is measured for the second regions. Since in the second regions embedding is performed in a period which is a plurality of the repetition period of the first regions, the autocorrelation may be measured in every any plurality of number of the repetition period of the first regions (24, 48, 72, . . . for the foregoing example) and some of the calculations can be omitted. Further, the repetition period of the second regions is the same as the size of the second region.

Figure 28:
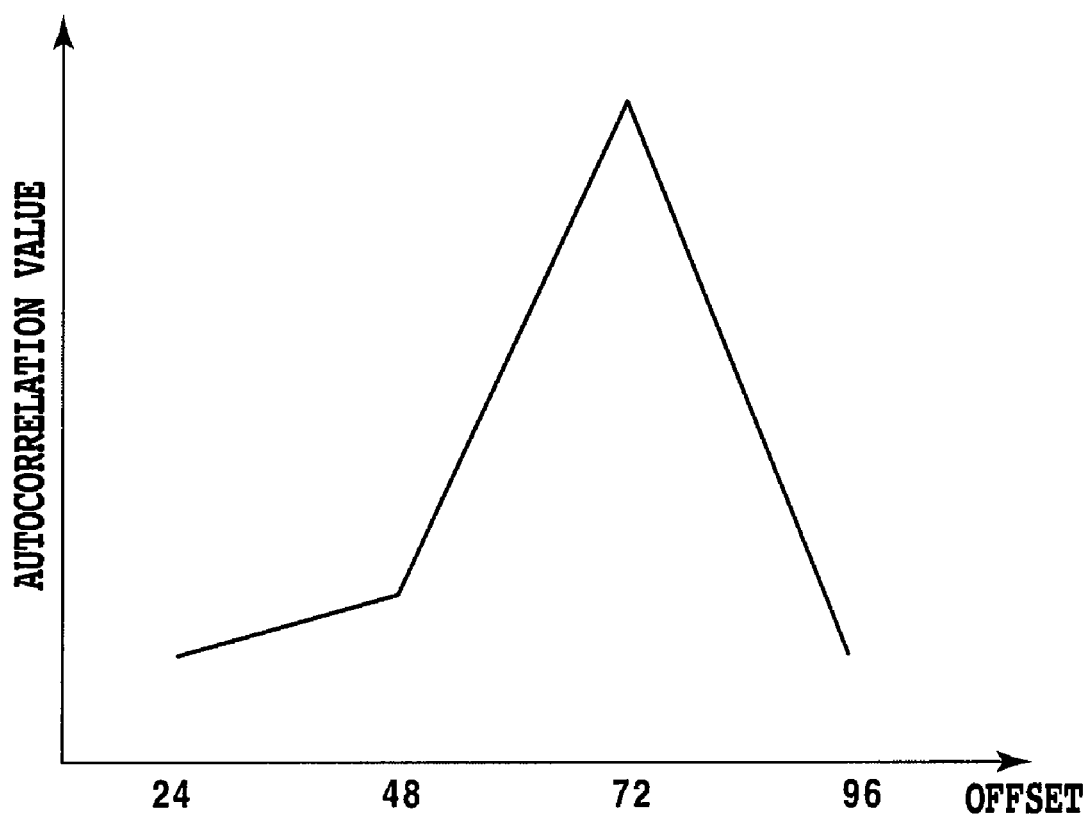
FIG. 28 is a graph illustrating an example of calculated autocorrelation values against offset values in the second regions.

FIG. 28 is a graph illustrating an example of calculated autocorrelation values against offset values in the second regions.

Lastly, a start position of the second region is identified. Since the start position of the first region and the start position of the second region are synchronized in the embedding, the position can be narrowed down to any of the start position of the first region.

The error correction code is utilized for determining the position of the second region. Similar to the case of the first region, the error correcting code is added other than the embedded data for the second region. Sine the size of the second region is already known, the error correction processing is performed sequentially for potential regions from a top position of the first regions.

Figure 29:
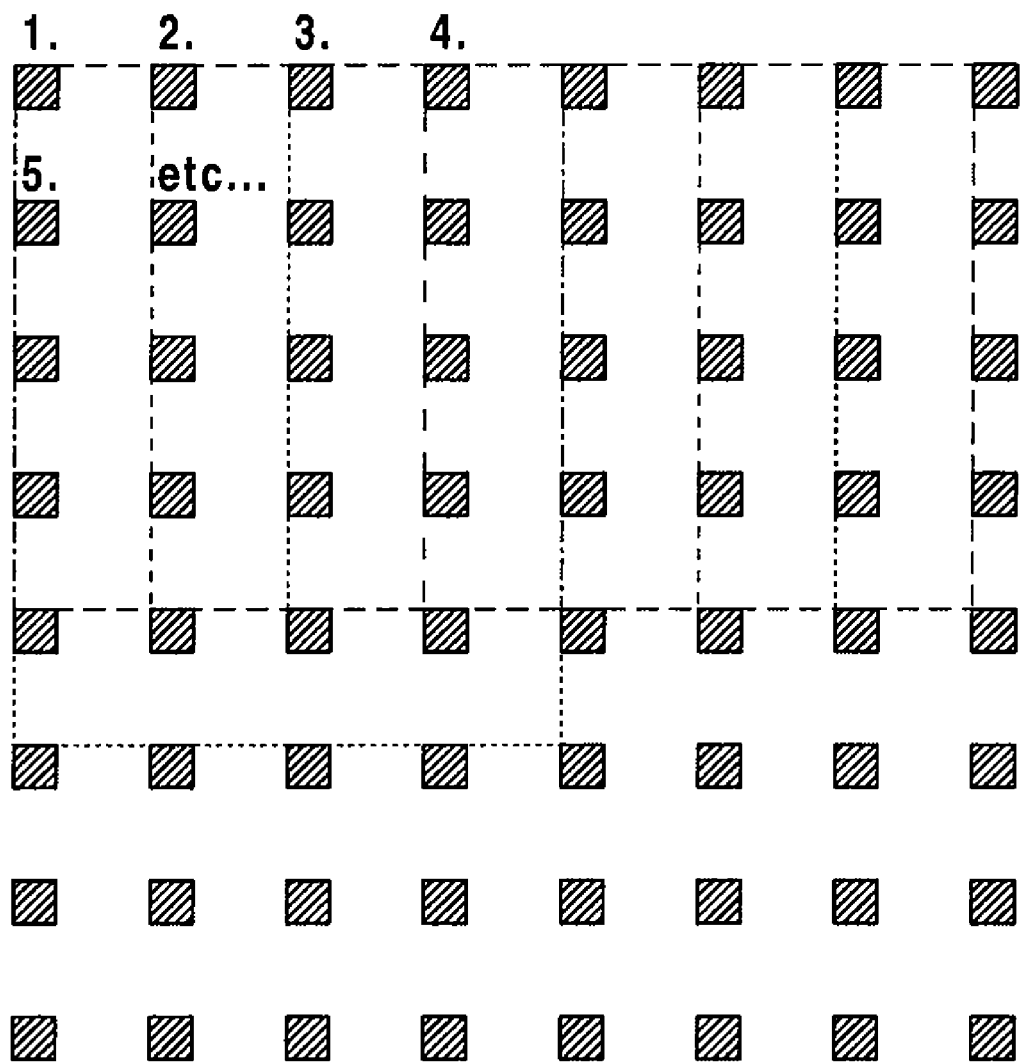
FIG. 29 is a diagram for illustrating a method of determining a position of the second region.

FIG. 29 is a diagram for illustrating a method for identifying the second region position.

In FIG. 29, the autocorrelation shows that the second region size is four times the repetition period of the first regions. Here, any of 4×4=16 is to be the start position of the second region, and the error correction processing is applied by shifting the position as 1, 2, 3, 4, 5, etc. When the error correction processing has succeeded, it is possible to employ the position as the second region position.

The embedded data stored in the second regions can be extracted by the above processing.

(Multi-LVBC)

In the method for decoding a LVBC, the embedded information analyzing unit 1701 estimates a grid interval (grid size) from an interval between two neighboring dots; corrects a shift in angle to determine coordinates; and measures a direction in which each dot is displaced from a reference point of a grid. Accordingly, a size of dot constituting the LVBC and the grid interval can be freely selected to some extent. Such LVBC characteristics are used to be able to embed a plurality of LVBCs (hereinafter referred to as a multi-LVBC) respectively having different dot sizes and grid intervals in one sheet. Note that a region on a sheet to be embedded with a LVBC is referred to as a LVBC region.

Figure 10B:
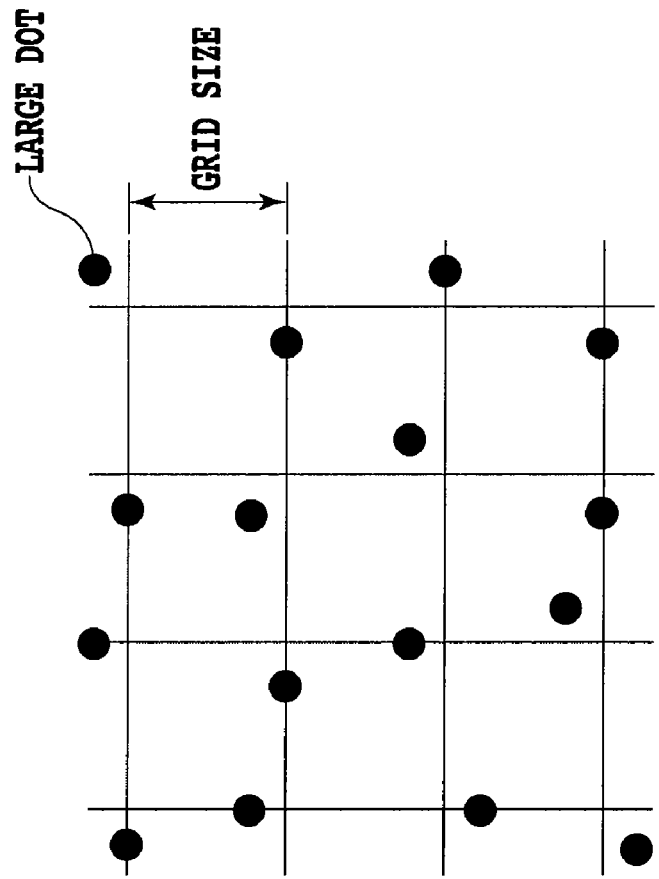
FIG. 10B is a diagram schematically illustrating a LVBC consisting of dots having a large size.
Figure 10A:
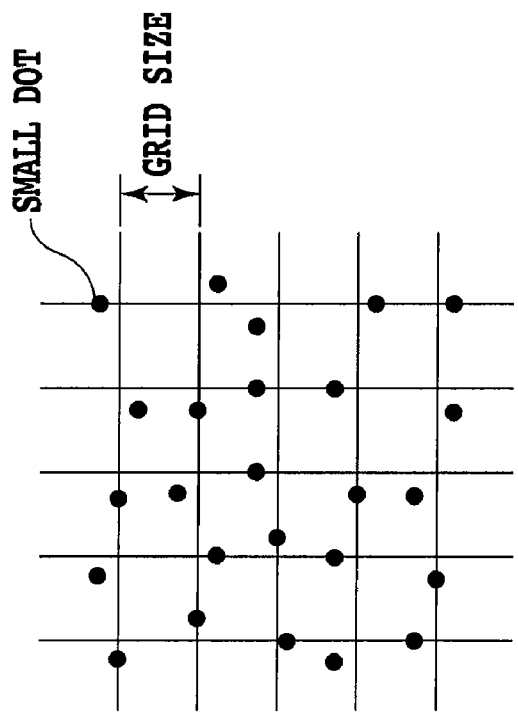
FIG. 10A is a diagram schematically illustrating a LVBC consisting of dots having a small size.

FIG. 10A illustrates a LVBC consisting of dots having a small size (hereinafter referred to as small dots). The small dots have the small size, and therefore disappear by copying.

FIG. 10B illustrates a LVBC consisting of dots having a large size (hereinafter referred to as large dots). The large dots have the large size, and therefore do not disappear even by copying. A principle of the multi-LVBC will be described later.

The two LVBCs are adjacently embedded in one sheet, so that a boundary line between the two LVBC regions is desirably difficult to determine. For this purpose, a grid size of the LVBC consisting of the large dots is made larger than that of the LVBC consisting of the small dots to thereby approximately equalize an average density of the LVBC region consisting of the large dots with that of the LVBC region consisting of the small dots. This enables a user to recognize a density of the entire LVBC region on the sheet almost uniform.

Figure 5:
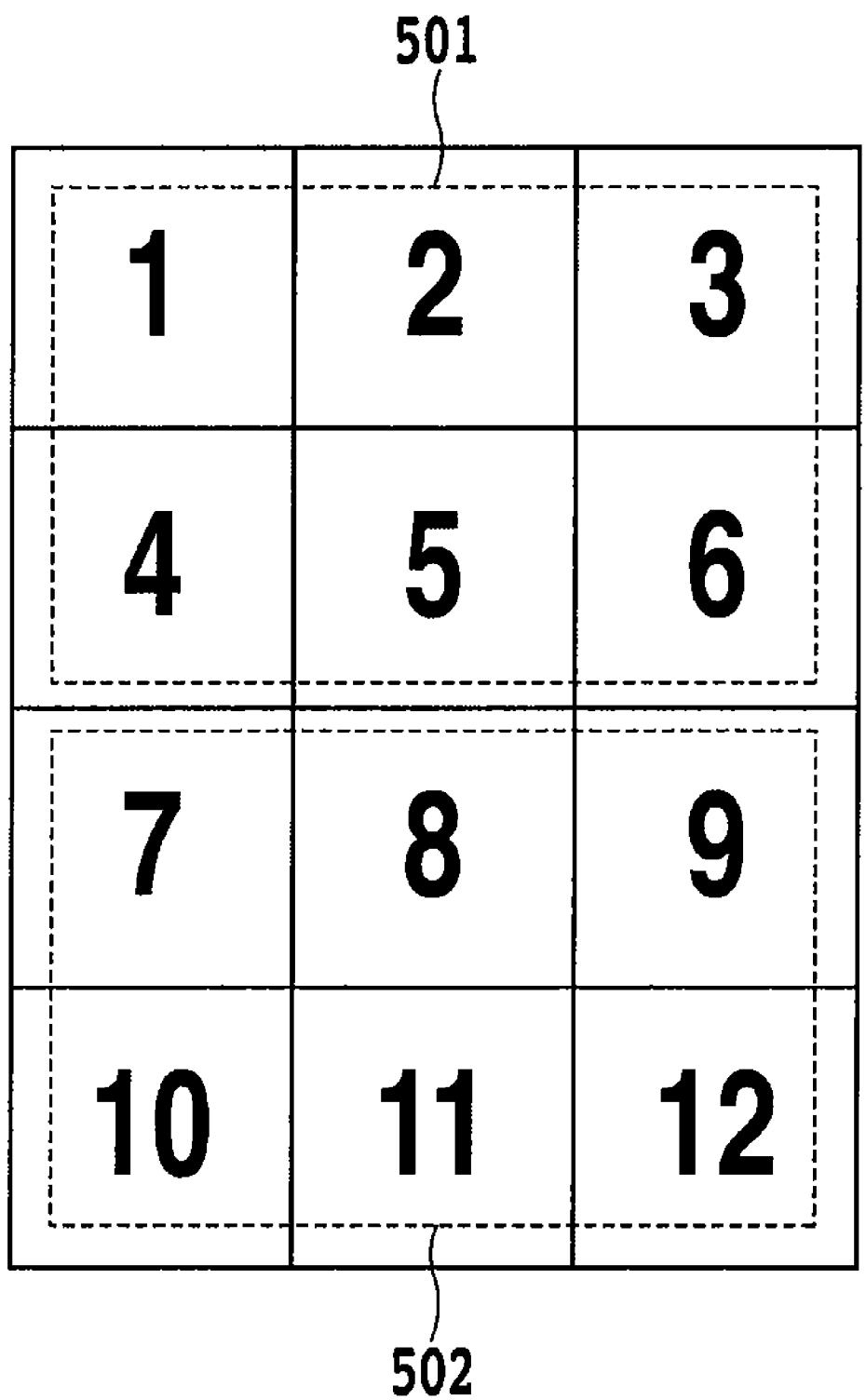
FIG. 5 is a diagram illustrating an original being divided into a plurality of regions.

As described above, in the method for decoding a LVBC, dots are detected, analyzed, and converted to thereby obtain a grid interval and decode the LVBC. That is, in a normal LVBC, one peak appears within the grid interval (see FIG. 21), so that a value of the peak is set as the grid interval to be thereby able to decode the LVBC. However, in the multi-LVBC, a plurality of LVBCs respectively having different dot sizes and grid intervals are embedded in different LVBC regions on one sheet, so that a plurality of grid interval peaks appear. Accordingly, in order to decode the multi-LVBC, processing different from that for decoding the normal LVBC is required. For this reason, to decode the multi-LVBC, an original is divided into a plurality of regions as illustrated in FIG. 4 or 5, and dot analysis is performed for each of the regions as described below.

The embedded information analyzing unit 1701 illustrated in FIG. 17 performs the dot analysis for each of the regions to estimate the grid interval in each of the regions. Subsequently, the embedded information analyzing unit 1701 compares the estimated grid intervals after having estimated the grid intervals in all of the regions, and then determines whether or not a plurality of LVBCs regions are present. Specifically, the embedded information analyzing unit 1701 determines that the number of the LVBC regions present on the original is one if the grid intervals in all of the regions are the same. On the other hand, if there are regions having different grid intervals, the embedded information analyzing unit 1701 determines that a plurality of LVBCs regions are present on the original, and brings together regions having the same grid interval to make them one group.

Figure 4:
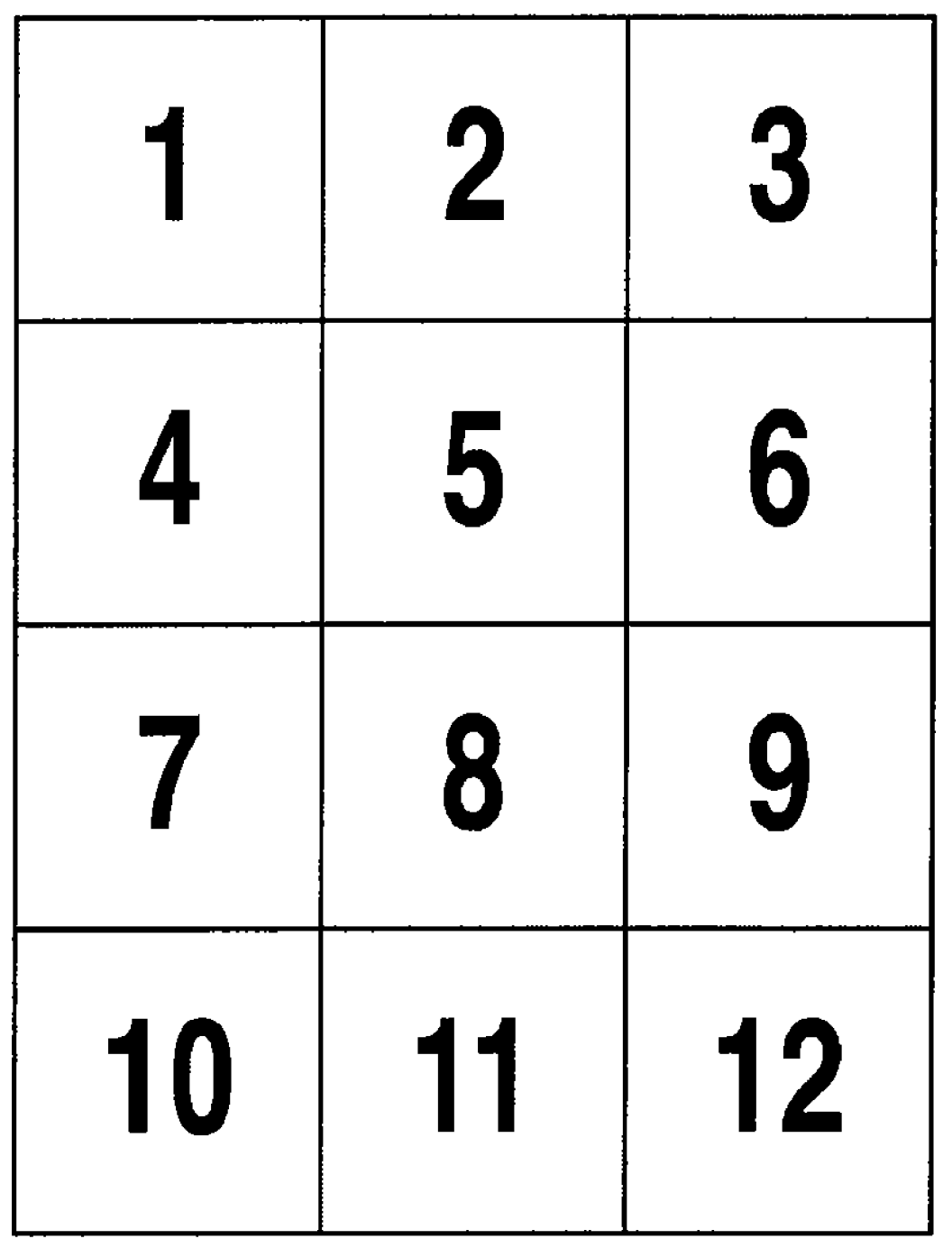

In a sheet illustrated in FIG. 4, it is assumed, for example, that respective grid intervals in regions 1 to 6 are the same, and those in regions 7 to 12 are the same. Further it is assumed that the grid interval in the regions 1 to 6 is larger than that in the regions 7 to 12. In such a case, as illustrated in FIG. 5, the regions 1 to 6 on an upper half of the sheet are made a large dot existence region (LVBC region consisting of the large dots) 501, and the regions 7 to 12 on a lower half of the sheet are made a small dot existence region (LVBC region consisting of the small dots) 502.

The above example describes the case where the respective divided regions on the sheet approximately coincide in region with one another, and the LVBC regions consisting of the large dots and of the small dots approximately coincide in region with each other. However, even if this is not the case, a grid interval in a LVBC region occupying a large region of each divided region appears as the peak, so that by using the grid interval, it becomes possible, in principle, to perform the above grouping. The above example is one where the original is divided into the twelve regions; however, this is just one example, and the division number may be increased. By increasing the division number, i.e., by dividing the original into smaller regions, the divided regions and actual LVBC regions become more likely to coincide in region with each other.

(Principle that Small Dots Disappear and Only Large Dots Remain by Copying)

Figure 11:
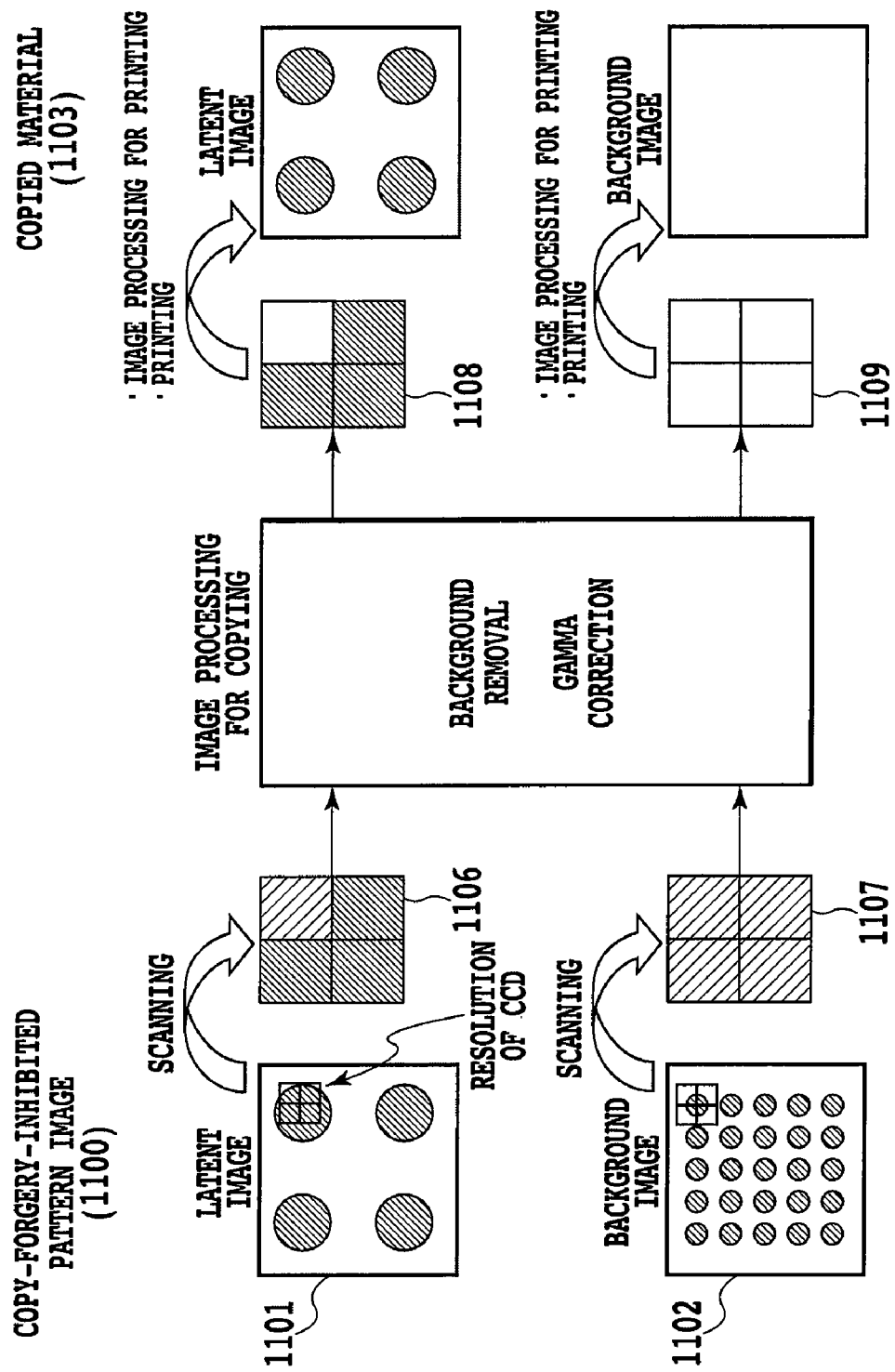
FIG. 11 is a diagram for explaining a principle that small dots disappear and only large dots remain by copying.

FIG. 11 is used to describe the principle that small dots disappear and only large dots remain by copying.

It is assumed that an original scanning unit in the image forming device is a 600 dpi CCD, and a printing unit of the image forming device is a 600 dpi laser printer. It is also assumed that Reference numeral 1100 represents a copy-forgery-inhibited pattern image before copying, and Reference numeral 1103 is a copied material of the copy-forgery-inhibited pattern image 1100.

The copy-forgery-inhibited pattern image 1100 includes a part of a latent image (large dot group) 1101 and a part of a background image (small dot group) 1102. It is here assumed that a size of the small dot is approximately 42 μm×42 μm (one pixel for 600 dpi), and that of the large dot is approximately 126 μm×126 μm (three pixels×three pixels for 600 dpi).

If the large dots are scanned with the image scanning unit such as a scanner having a resolution of 600 dpi, the image scanning unit generates an image 1106 consisting of very dark (low brightness) pixels. On the other hand, if the image scanning unit scans the small dots, it generates an image 1107 consisting of light (high brightness) pixels. The image scanning unit sends the generated images 1106 and 1107 to an image processing unit.

The image processing unit performs image processing (image processing for copying) of the received images 1106 and 1107 for copying. The image processing for copying includes publicly known background removal processing, Log conversion processing, gamma correction processing, and the like.

The background removal processing of the image processing for copying causes the largest factor that makes the latent image appear on the copied material. The background removal processing is one intended for, for example, removing light gray portions on a newspaper, and converts the portions into far lighter gray state. Based on the background removal processing, the image in the light state 1107 is converted into an image in a far lighter state 1109. On the other hand, the image in the dark state 1106 remains an image in the dark state 1108 even after the background removal processing. As a result of the background removal processing, the latent image within the copy-forgery-inhibited pattern image scanned with the use of the image scanning unit having the resolution of 600 dpi appears on the copied material, whereas the background image disappears, as described above.

The above is the principle that small dots disappear and only large dots remain by copying.

Embodiment 1

System Configuration

Figure 1:
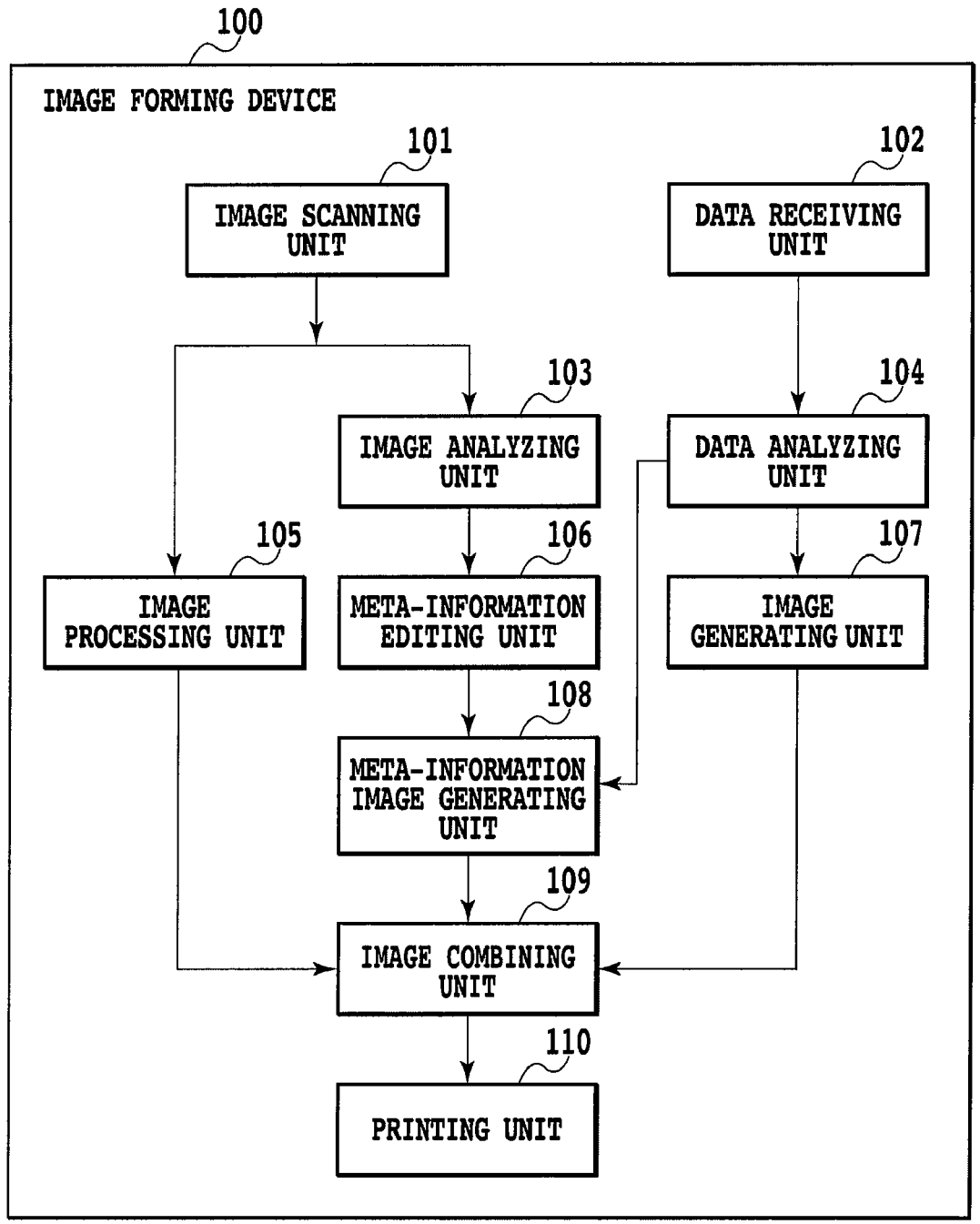
FIG. 1 is a block diagram illustrating a configuration of an image forming device of the present invention.

FIG. 1 is a block diagram illustrating an example of a configuration of an image forming device in Embodiment 1.

The image forming device 100 includes an image scanning unit 101, data receiving unit 102, image analyzing unit 103, data analyzing unit 104, image processing unit 105, meta-information editing unit 106, image generating unit 107, meta-information image generating unit 108, image combining unit 109, and printing unit 110.

First, processing performed by the image forming device 100 upon printing is described.

The data receiving unit 102 receives print data from an information processing device (not shown) such as a PC through a communication line such as a LAN. Alternatively, the data receiving unit 102 may receive the print data through a USB memory or an interface such as a Centronics interface. The print data includes a drawing instruction such as PCL (Printer Control Language), and management information such as a document name and a name of an owner having requested printing.

The data analyzing unit 104 analyzes the print data; separates the drawing instruction and management information included in the print data from each other; passes the drawing instruction to the image generating unit 107; and sends the management information to the meta-information image generating unit 108.

The image generating unit 107 generates image data according to the drawing instruction, and sends the image data to the image combining unit 109.

The meta-information image generating unit 108 converts the management information having been received from the data analyzing unit 104 into meta-information image data in a LVBC format, and sends it to the image combining unit 109.

The image combining unit 108 combines the image data having been received from the image generating unit 107 with the meta-information image data having been received from the meta-information image generating unit 108 to generate combined image data, and sends the combined image data to the printing unit 110.

The printing unit 110 prints the received combined image data on a sheet.

Next, processing performed by the image forming device 100 upon copying is described, also by using FIG. 1.

The image scanning unit 101 scans an original placed on a platen; converts it into image data; and sends the image data to the image analyzing and processing units 103 and 105.

The image analyzing unit 103 is equivalent to the embedded information analyzing unit 1701 illustrated in FIG. 17, and obtains additional information by decoding a LVBC embedded in the sheet, to send the additional information to the meta-information editing unit 106.

The meta-information editing unit 106 edits the additional information having been received from the image analyzing unit 103 as necessary. In Embodiment 1, the meta-information editing unit 106 adds history information to the additional information, and sends the additional information added with the history information to the meta-information image generating unit 108. The history information includes at least one of identification information on the image forming device (e.g., model name, IP address, MAC address), printed (copied) date and time, user ID, and departmental ID.

The meta-information image generating unit 108 again converts the additional information having been received from the meta-information editing unit 106 into meta-image data in the LVBC format, and sends it to the image combining unit 109.

The image processing unit 105 performs the image processing for copying of the image data having been scanned by the image scanning unit 101, and sends the image-processed data to the image combining unit 109. The image processing for copying may be based on any technique of those skilled in this art.

The image combining unit 109 combines the image data having been image-processed for copying with the meta-image data in the LVBC format to generate combined image data, and sends the combined image data to the printing unit 110.

The printing unit 110 prints the received combined image data on a sheet.

(Description of Operations)

In Embodiment 1, the history information is embedded in a LVBC region (hereinafter referred to as a history information region) consisting of the small dots that disappear by copying, and coordinate information indicating an encoded position (coordinate position) of the history information region is embedded in a LVBC region (hereinafter referred to as a coordinate information region) consisting of the large dots that do not disappear even by copying. That is, the coordinate position as the additional information indicates the region embedded with the history information that is the additional information excluding the coordinate information. With reference to the coordinate information upon copying, the history information is read out from the history information region; and subjected to necessary editing, and then the edited history information is again embedded in the history information region to thereby manage the history information on the original. It is here assumed that the number of history information regions is one in Embodiment 1.

Figure 2:
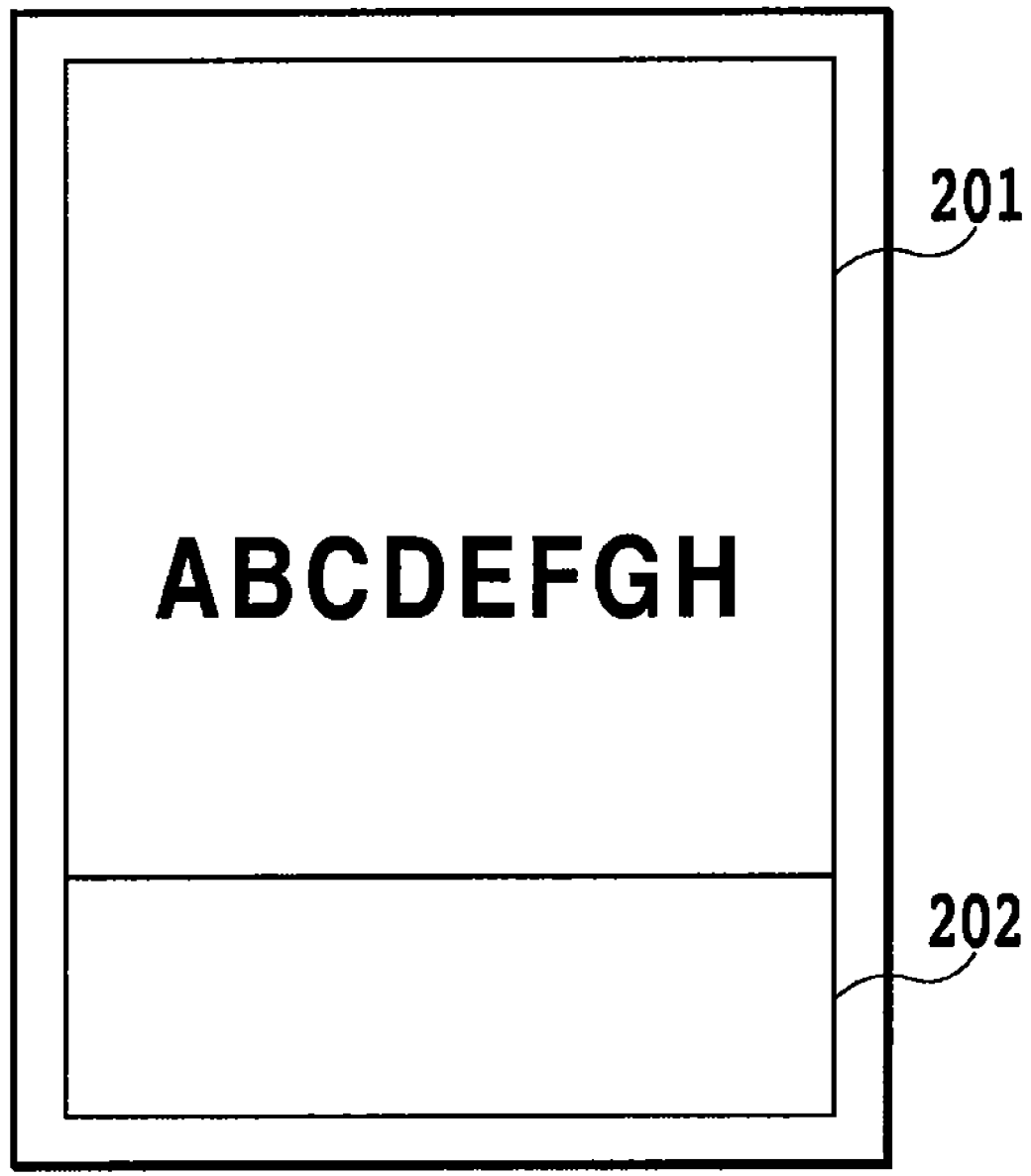
FIG. 2 is a diagram illustrating an original including a coordinate information region and history information region.

FIG. 2 is a diagram illustrating an original including a coordinate information region 201 and a history information region 202.

Figure 3:
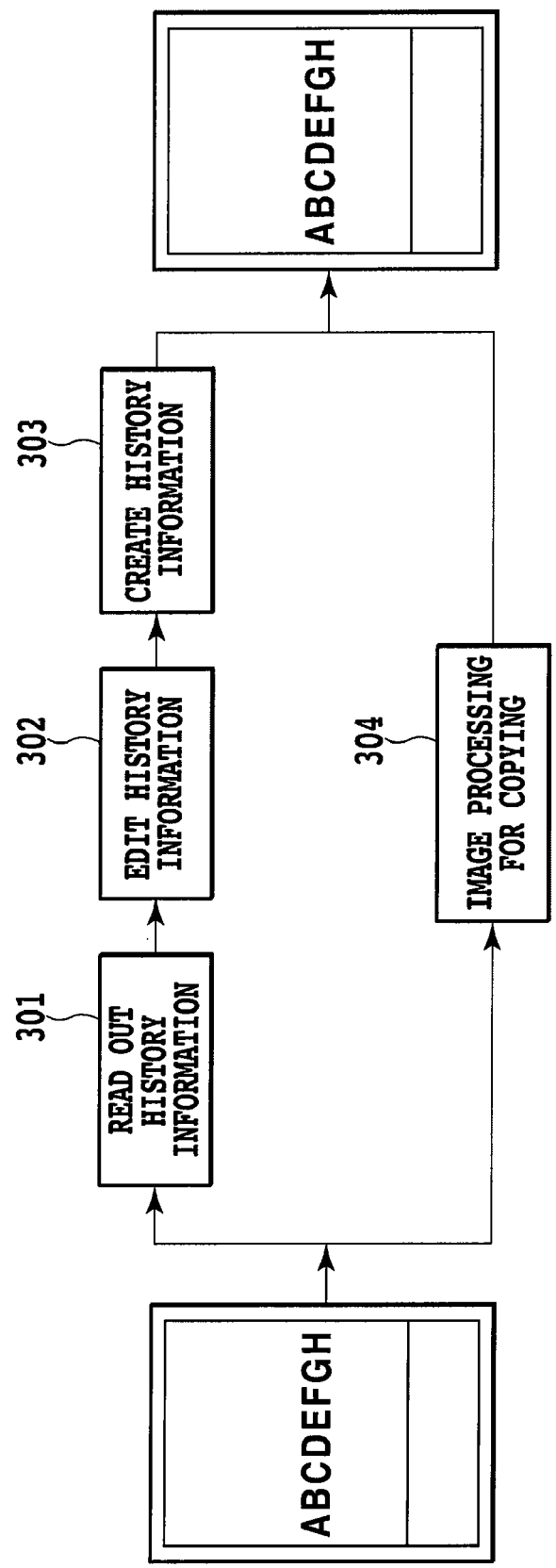
FIG. 3 is a diagram illustrating a data flow upon copying of the original illustrated in FIG. 2.

FIG. 3 is a diagram illustrating a processing flow for copying the original illustrated in FIG. 2.

Referring to FIG. 3, the image data having been scanned by the image scanning unit 101 is subjected to two types of processing in parallel. The two types of processing are the processing for history information, and the image processing for copying. The processing for history information includes:

reading out history information embedded in the history information region 202 (301); editing the read-out history information (302); creating again history information with small dots (303); and embedding the created history information in the history information region 202. The image processing for copying (304) includes the background removal processing and the like. These types of processing are described below with the use of FIG. 1.

First, the processing for history information (301 to 303) is described.

The image analyzing unit 103 receives the image data from the image scanning unit 101. Then, the image analyzing unit 103 obtains the LVBC consisting of the large dots and that consisting of the small dots from the received image data.

The meta-information editing unit 106 extracts the history information from the LVBC consisting of the small dots, and edits it.

The meta-information image generating unit 108 generates a LVBC consisting of small dots on the basis of the edited history information.

The above is the processing for history information.

Next, the image processing for copying is described.

The image processing unit 105 receives the image data from the image scanning unit 101. Then, the image processing unit 105 applies the image processing for copying such as the background removal processing to the received image data, and generates the image-processed image data. As described above, due to the image processing for copying, the LVBC (consisting of the small dots) representing the history information disappears, and that (consisting of the large dots) representing the coordinate information only remains.

The above is the image processing for copying.

The image combining unit 109 receives the LVBC (consisting of the small dots) representing the history information from the meta-information image generating unit 108, and that (consisting of the large dots) representing the coordinate information from the image processing unit 105. Then, the image combining unit 109 combines these two pieces of information to generate combined image data, and sends the combined image data to the printing unit 110.

The printing unit 110 prints the combined image data on a sheet.

Figure 6:
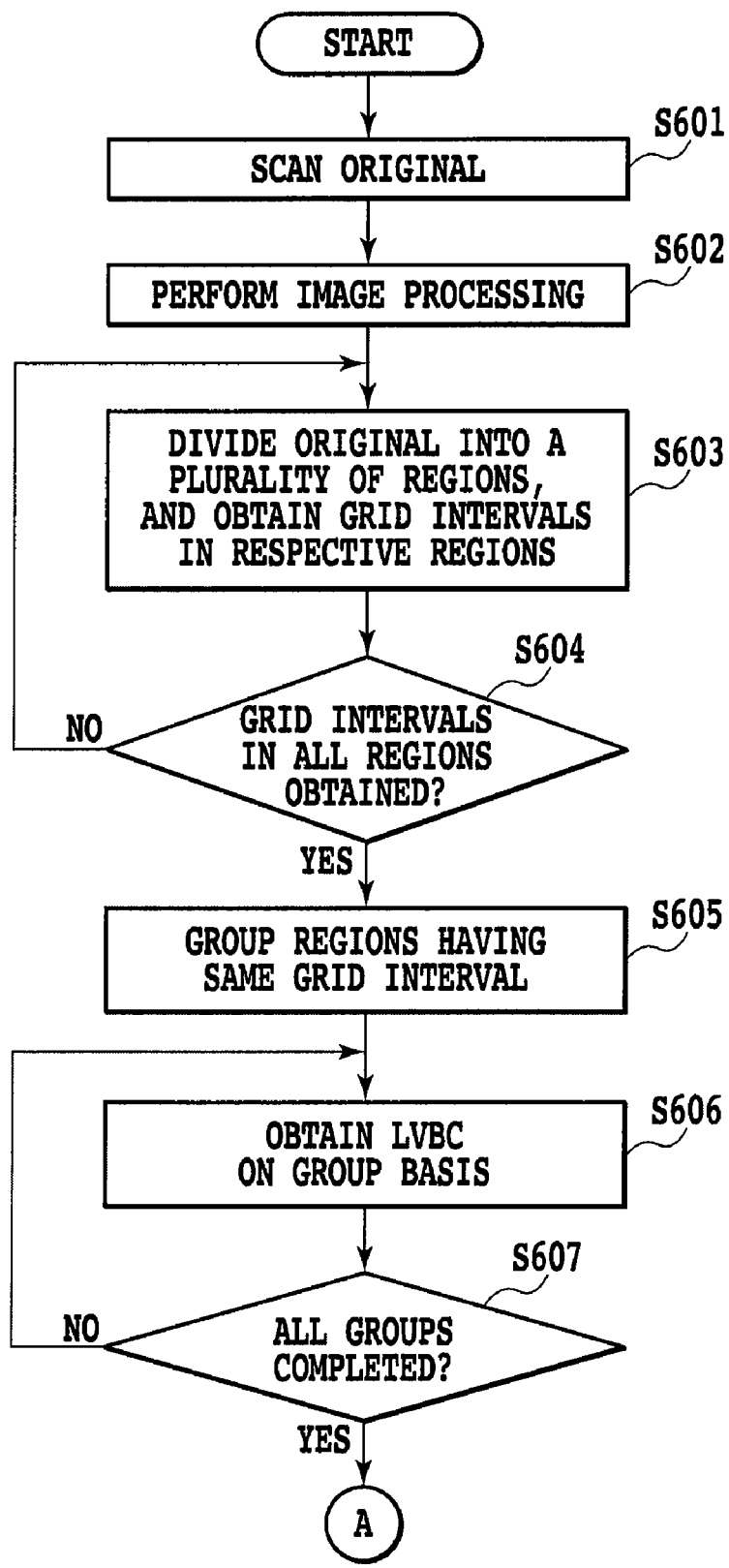
FIG. 6 is a flowchart illustrating a flow of processing performed by the image forming device upon printing/copying of an original.
Figure 7:
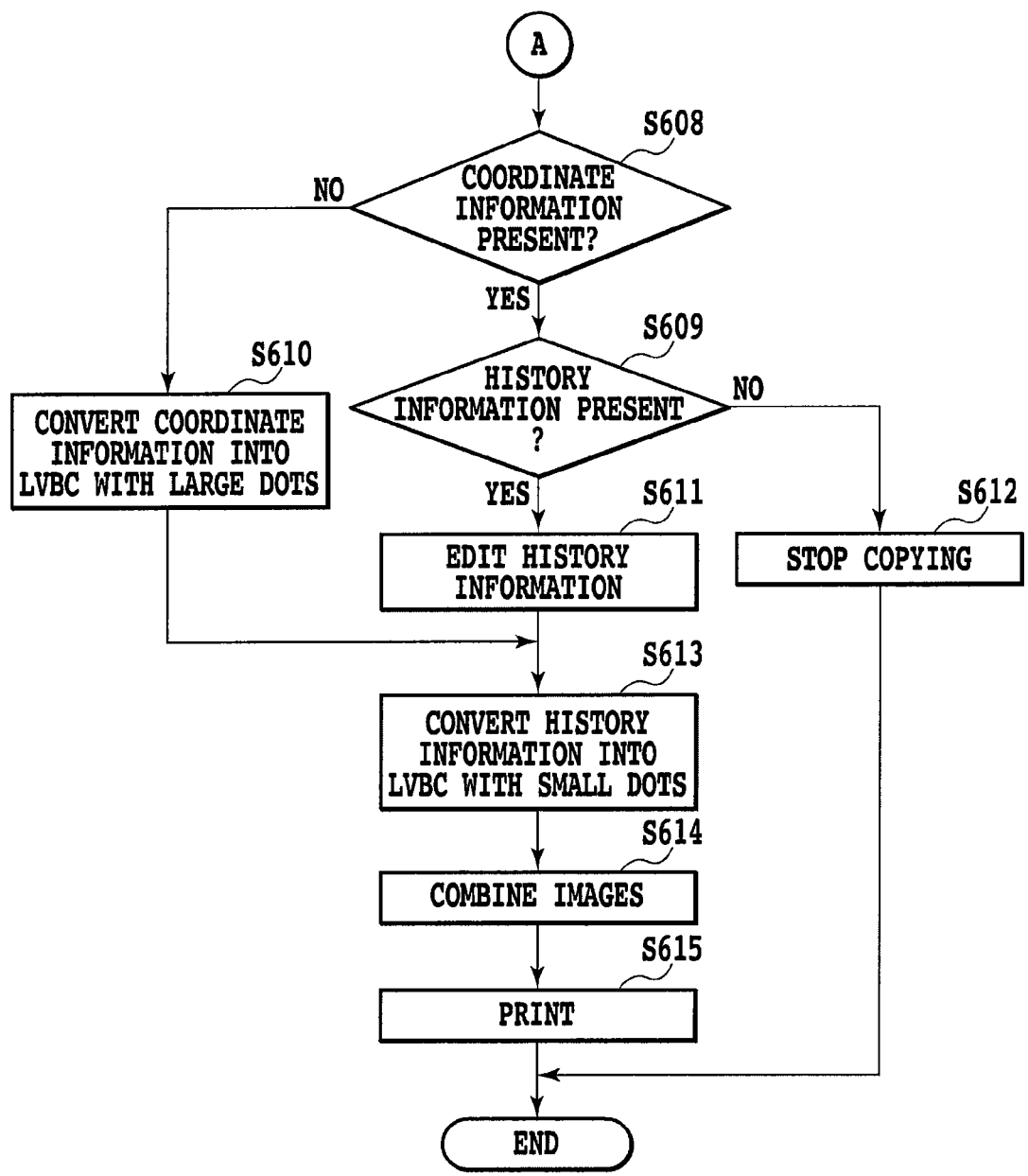
FIG. 7 is a flowchart illustrating the flow of the processing performed by the image forming device upon printing/copying of the original.

FIGS. 6 and 7 are a flowchart illustrating a flow of the processing performed by the image forming device 100 upon copying of an original.

In S601, the image scanning unit 101 scans the original, and sends the image data including the LVBC consisting of the small dots and that consisting of the large dots to the image processing and analyzing units 105 and 103.

In S602, the image processing unit 105 applies the image processing for copying such as the background removal processing to the received image data, and sends the image-processed image data to the image combining unit 109.

On the other hand, in parallel with the processing of S602, the image analyzing unit 103 analyzes the LVBCs included in the received image data in the following procedure:

In S603, the image analyzing unit 103 divides the original into a plurality of regions, and obtains grid intervals in the respective regions. For example, as illustrated in FIG. 4 or 5, the original is divided into twelve regions, and obtains the grid intervals in the respective regions.

In S604, the image analyzing unit 103 determines whether or not it has obtained the grid intervals in all of the regions, and if it has obtained the grid intervals in all of the regions, it proceeds to processing of S605.

In S605, the image analyzing unit 103 compares the grid intervals in the respective regions with one another, and groups together the regions having the same grid interval.

In S606, the image analyzing unit 103 obtains the LVBCs on the group basis.

In S607, the image analyzing unit 103 determines whether or not it has obtained the LVBC from all of the groups, and if it has obtained the LVBCs from all of the groups, it proceeds to processing of S608.

In S608, the image analyzing unit 103 determines whether or not the coordinate information is embedded in the LVBCs each consisting of the large dots, which were obtained in S606. The coordinate information is embedded in the LVBC that consists of the large dots and does not disappear even by copying, so that no embedment of the coordinate information means first copying. Accordingly, in such a case, the image analyzing unit 103 proceeds to processing of S610.

In S610, the meta-information image generating unit 108 embeds the coordinate information (this coordinate information indicates the history information region) in the coordinate information region (LVBC region consisting of the large dots).

In S613, the meta-information image generating unit 108 embeds history information on the first copying in the history information region (LVBC region consisting of the small dots) indicated by the coordinate information. Note that in the present embodiment, as is clear from the flowchart, the history information is not embedded in any region other than the history information region indicated by the coordinate information (i.e., any region other than the existence region of the LVBC consisting of the small dots).

In S614, the image combining unit 109 combines the image data having been received from the image processing unit 105 with the data having been received from the meta-information image generating unit 108 to generate the combined image data. That is, upon the first copying, the image combining unit 109 combines the image data (S602), LVBC consisting of the large dots (S610), and LVBC consisting of the small dots (S613) to generate the combined image data.

In S615, the printing unit 110 prints the combined image data on the sheet.

On the other hand, as a result of the determination in S608 whether or not the coordinate information is embedded in the LVBC consisting of the large dots, if the coordinate information is embedded, the image analyzing unit 103 proceeds to processing of S609.

In S609, the image analyzing unit 103 determines whether or not history information is embedded in a history information region indicated by the coordinate information. If the history information is not embedded, it can be considered that the history information has been lost because of copying by an image forming device different from that in the present embodiment. In this case, the image analyzing unit 103 determines that the original is one created by illegal copying, and then proceeds to S612 where the copying is stopped. On the other hand, if the history information is embedded, the meta-information editing unit 106 reads out the history information, and edits it to add history information on the current copying (second or later copying) in S611. Specifically, in S611, the meta-information editing unit 106 adds the history information on the current copying to that having been read out. Note that an amount of information capable of being embedded in a LVBC is limited, and if the history information exceeds the limitation, a setting may be made such that the history information having been read out is replaced by that on the current copying (second or later copying). If such setting may be made, and has been made, the history information before the editing will be replaced by that on the current copying (second or later copying). That is, in such a case, the history information having been read out will disappear, and that on the current copying will be embedded in the history information region.

In S613, the meta-information image generating unit 108 embeds the edited history information in the history information region (LVBC region consisting of the small dots) indicated by the coordinate information having been read out in S608. In Embodiment 1, the number of history information regions is one, so that the meta-information image generating unit 108 embeds the edited history information in the history information region in which the history information before the editing was embedded.

In S614, the image combining unit 109 combines the image data having been received from the image processing unit 105 with the data having been received from the meta-information image generating unit 108 to generate the combined image data. That is, upon copying, the image combining unit 109 combines the image data (S602), LVBC consisting of the large dots (S610), and LVBC consisting of the small dots (S613) to generate the combined image data.

In S615, the printing unit 110 prints the combined image data on the sheet.

Embodiment 2

In Embodiment 2, two history information regions are provided, differently from Embodiment 1. The respective history information regions are hereinafter referred to as first and second history information regions.

Figure 9:
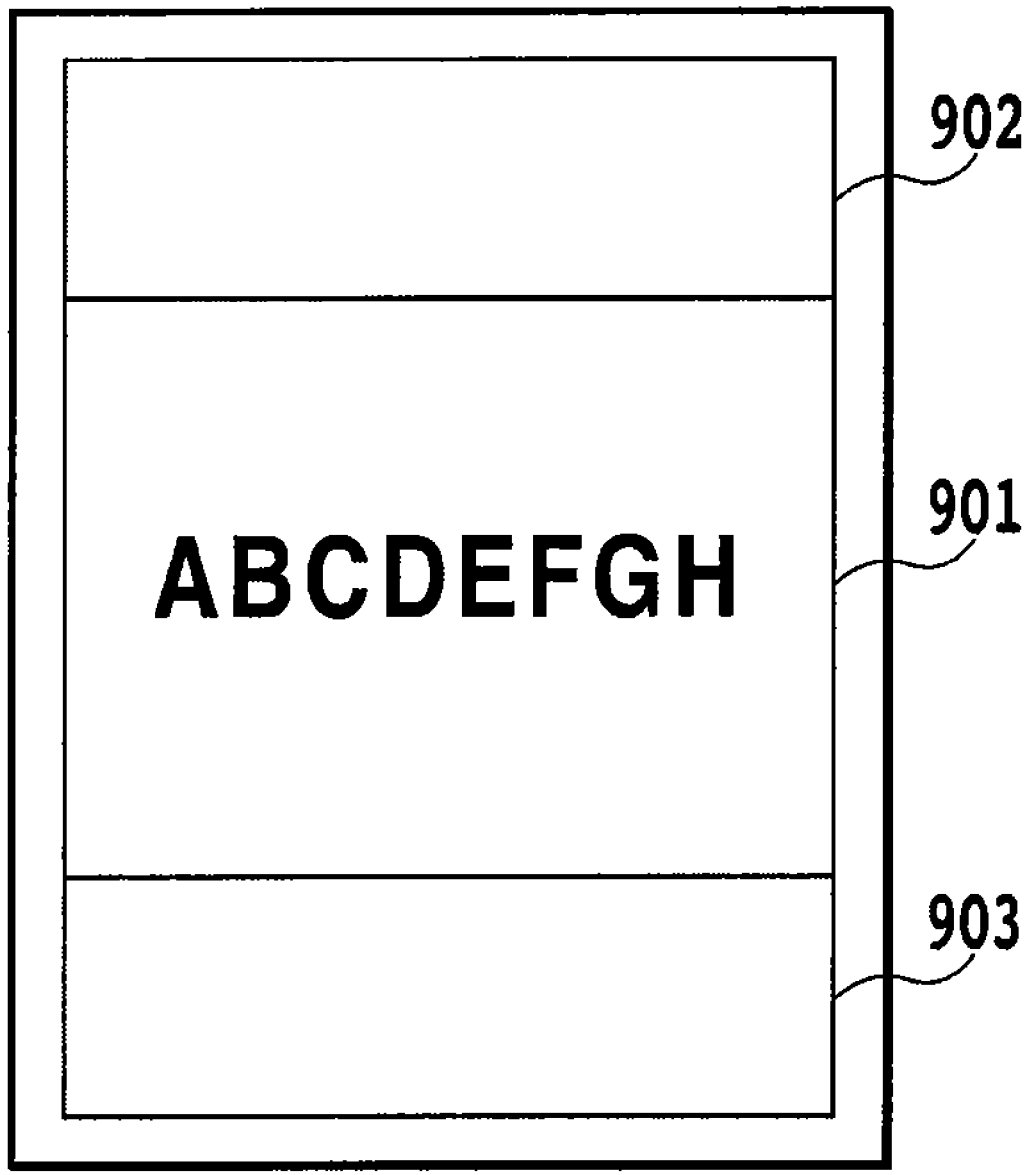
FIG. 9 is a diagram illustrating an original including first and second history information regions and a coordinate information region.

FIG. 9 is a diagram illustrating an original including the first and second history information regions 902 and 903 and a coordinate information region 901.

The coordinate information region 901 is a LVBC region consisting of the large dots, and the first and second history information regions 902 and 903 are LVBC regions each consisting of the small dots.

A configuration of an image forming device in Embodiment 2 is the same as that in Embodiment 1, and therefore a description of it is omitted.

Figure 8:
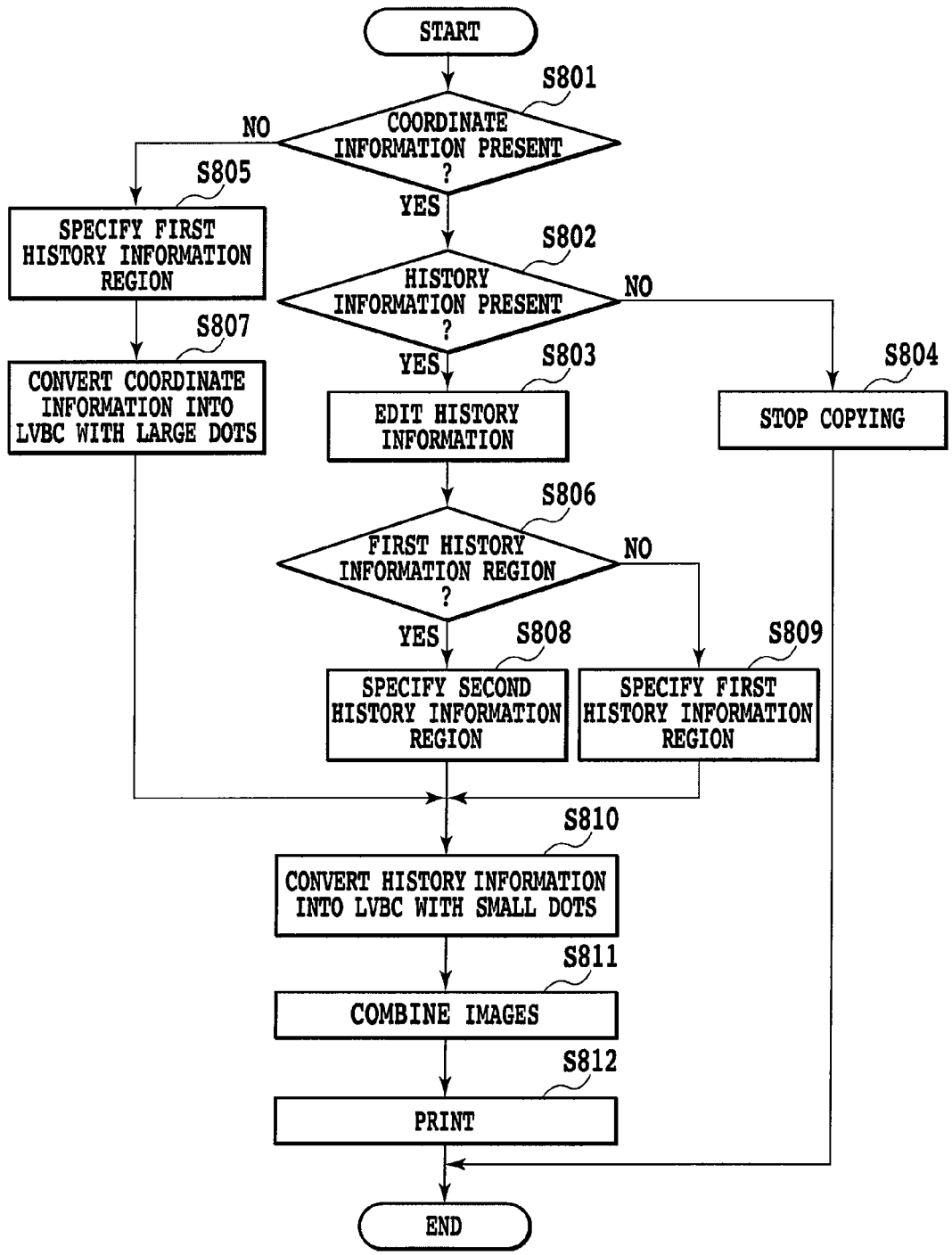
FIG. 8 is a flowchart illustrating a flow of processing performed by the image forming device upon printing/copying of an original.

FIG. 8 is a flowchart illustrating a flow of processing performed by the image forming device 100 upon copying of the original.

Embodiment 2 is described below according to the flowchart illustrated in FIG. 8. Note that processing from the start to steps of scanning image data from the original to analyze it, and obtaining LVBCs is the same as that in Embodiment 1, so that the following description gives processing after all of the LVBCs have been obtained.

In S801, the image analyzing unit 103 determines whether or not coordinate information is embedded in the LVBC consisting of the large dots. The coordinate information is embedded in the LVBC that consists of the large dots and does not disappear even by copying, so that no embedment of the coordinate information means first copying. Accordingly, in such a case, the image analyzing unit 103 proceeds to processing of S805.

In S805, the meta-information image generating unit 108 specifies the first history information region (LVBC region consisting of the small dots) 902 as a region for embedding history information on the first copying (hereinafter referred to as first history information).

In S807, the meta-information image generating unit 108 encodes first coordinate information indicating a coordinate position of the first history information region 902, and embeds it in the coordinate information region (LVBC region consisting of the large dots) 901.

In S810, the meta-information image generating unit 108 embeds the first history information in the first history information region 902.

In S811, the image combining unit 109 combines the image data having been received from the image processing unit 105 with that having been received from the meta-information image generating unit 108. That is, upon the first copying, the image combining unit 109 combines the image data having been generated by the image processing unit 105, LVBC consisting of the large dots (S807), and LVBC consisting of the small dots (S810) to generate combined image data.

In S812, the printing unit 110 prints the combined image data on a sheet.

On the other hand, as a result of the determination in S801 whether or not the coordinate information is embedded in the LVBC consisting of the large dots, if the coordinate information is embedded, the image analyzing unit 103 proceeds to processing of S802.

In S802, the image analyzing unit 103 determines whether or not history information is embedded in a history information region indicated by the coordinate information.

If the history information is not embedded, it can be considered that the history information has been lost because of copying by an image forming device different from that of the present invention. In this case, the image analyzing unit 103 determines that the original is one created by illegal copying, and then proceeds to S804 where the copying is stopped. On the other hand, if the history information is embedded, the meta-information editing unit 106 reads out the history information, and edits it to add history information on the current copying (second or later copying) in S803. Specifically, in S803, the meta-information editing unit 106 adds the history information on the current copying to that having been read out. Note that an amount of information capable of being embedded in a LVBC is limited, and if the history information exceeds the limitation, the history information before the editing may be replaced by that after the editing.

In S806, the meta-information editing unit 106 determines whether or not the history information is embedded in the first history information region 902. If the history information is embedded in the first history information region 902, the meta-information image generating unit 108 specifies the second history information region (LVBC region consisting of the small dots) 903 as a region for embedding the edited history information (referred to as the second history information) in S808. On the other hand, if the history information is not embedded in the first history information region 902, the meta-information image generating unit 108 specifies the first history information region 902 as the region for embedding the second history information in S809. Note that if there are three or more history information regions, it may be configured such that the respective history information regions are sequentially used, and after a last one of the history information regions has been used, a first one of the history information regions is used.

In S810, the meta-information image generating unit 108 embeds the second history information in the first or second history information region 902 or 903.

In S811, the image combining unit 109 combines the image data having been received from the image processing unit 105 with that having been received from the meta-information image generating unit 108. That is, upon copying, the image combining unit 109 combines the image data having been generated by the image processing unit 105, LVBC consisting of the large dots (S807), and LVBC consisting of the small dots (S810) to generate combined image data.

In S812, the printing unit 110 prints the combined image data on the sheet.

Other Embodiments

In Embodiment 1 or 2, it is envisaged that the first printing is intended for copying the original not embedded with any LVBC; however, the first printing may be performed from an information processing device such as a PC. In such a case, it is not necessary to read out any LVBC upon the printing, so that a LVBC consisting of the large dots and that consisting of the small dots can be newly generated without exception upon the printing.

Also, in Embodiment 1 or 2, information to be embedded in the LVBC consisting of the large dots is only the coordinate information; however, information for specifying the original, such as a document name or control number besides the coordinate information may be embedded. Also, the history information on the first printing may be adapted to be embedded in both of the LVBC regions consisting of the small dots and of the large dots.

In the embodiments described above, the LVBC region consisting of the large dots is used as the coordinate information region (coordination information region indicating the LVBC consisting of the small dots). Also, the coordinate information region is used to thereby easily find the LVBC region consisting of the small dot upon copying, and then the information (e.g., history information) is embedded in the LVBC region consisting of the small dots.

However, the LVBC region consisting of the small dots may be found in a different manner. That is, to find the LVBC region consisting of the small dots, the LVBC region consisting of the large dots may not be used as the coordinate information region (coordinate information region for finding the LVBC region consisting of the small dots). Because the LVBC region consisting of the large dots is not used as the coordinate information region, a blank region on the image having been image-processed by the image processing unit 105 may be set as the LVBC region consisting of the small dots, for example. Nonetheless, the method using the LVBC region consisting of the large dots as the coordinate information region to find the LVBC region consisting of the small dots is more convenient. This is because if content (corresponding to "ABCDEFGH" in FIG. 2) is superimposed on the LVBC region consisting of the small dots, the blank region on the image having been image-processed by the image processing unit 105 does not correspond to the LVBC region consisting of the small dots one-on-one.

The object of the present invention can also be accomplished in such a way that a system, or a computer (or CPU, or MPU) of the device reads a program code for realizing the procedure of the flowchart described in any of the above embodiments from a recording medium recorded thereon with the program code, and then executes it. The recording medium is a computer-readable recording medium. In this case, the program code itself read from the computer-readable recording medium realizes the functions of the above-described embodiments. For this reason, the program code, and the recording medium recorded thereon with the program code also constitute one of the present inventions.

As the recording medium for supplying the program code, a floppy disk, hard disk, optical disk, magnetooptical disk, CD-ROM, CD-R, magnetic tape, nonvolatile memory card, or ROM may be used, for example.

A case where an OS (operating system) or the like running on the computer performs part or all of actual processing under the instruction of the program code, and the processing realizes the functions of the above-described embodiments is also included.

Further, the program code read from the recording medium is written into a memory provided in an expansion board inserted into the computer or expansion unit connected to the computer. Then, a CPU provided in the expansion board or expansion unit performs part or all of the actual processing under the instruction of the program code, and the processing realizes the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-162721, filed Jun. 20, 2007, which is hereby incorporated by reference herein in its entirety.

What is claimed is:

1. An apparatus comprising:
    a unit configured to obtain image data by reading a document on which an image is printed, the image including a small dot group consisting of small dots, wherein the small dots will disappear upon duplication and wherein the small dot group has a history information area, and a large dot group consisting of large dots, wherein the large dots will not disappear upon duplication and wherein the large dot group has coordinate position information embedded therein;
    an image processing unit configured to perform image processing for the duplication on the image data that is obtained;
    an embedment information extraction unit configured (i) to extract the embedded coordinate position information, which shows an area on which the small dot group is dependent, using the large dot group for the image data that is obtained and (ii) to extract history information on the duplication using the small dot group;
    a unit configured to generate history information that includes information on the current duplication by editing the history information that is extracted; and
    a unit configured to generate image data such that, in the image data that was subjected to the image processing by the image processing unit, a small dot group having the generated history information embedded in the history information area is disposed at one or more positions indicated by the extracted coordinate position information.

2. The apparatus according to claim 1,
    wherein the history information on the current duplication includes time and date information of the duplication and identification information of the apparatus that performed the duplication.

3. A method comprising:
    performing the following steps using an image processing apparatus
    obtaining image data by reading a document on which an image is printed, the image including a small dot group consisting of small dots, wherein the small dots will disappear upon duplication and wherein the small dot group has a history information area, and a large dot group consisting of large dots, wherein the large dots will not disappear upon duplication and wherein the large dot group has coordinate position information embedded therein;

extracting the embedded coordinate position information, which shows area where the small dot group exists, using the large dot group for the obtained image data, and extracting history information on the duplication using the small dot group;

generating history information including history information on the current duplication by editing the history information that is extracted; and generating image data such that, in image data that has been subjected to image processing, a small dot group having the generated history information embedded in the history information area is disposed at one or more positions indicated by the extracted coordinate position information.

4. The method according to claim 1,
wherein the history information on the current duplication is identification information of the image formation apparatus.

5. A non-transitory computer-readable medium embodying a program for making a computer perform the steps of:

obtaining image data by reading a document on which an image is printed, the image including a small dot group consisting of small dots, wherein the small dots will disappear upon duplication and wherein the small dot group has a history information area, and a large dot group consisting of large dots, wherein the large dots will not disappear upon duplication and wherein the large dot group has coordinate position information embedded therein;

extracting the embedded coordinate position information, which shows an area where the small dot group exists, using the large dot group for the obtained image data, and extracting history information on the duplication using the small dot group;

generating history information including history information on the current duplication by editing the history information that is extracted; and generating image data such that, in image data that has been subjected to image processing, a small dot group having the generated history information embedded in the history information area is disposed at one or more positions indicated by the extracted coordinate position information.

* * * * *